US012767803B2

(12) United States Patent
Zhang et al.

(10) Patent No.: US 12,767,803 B2
(45) Date of Patent: Oct. 20, 2026

(54) POLYPROPYLENE COMPOSITION, PREPARATION METHOD THEREFOR, AND ARTICLE MADE THEREFROM

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Xiaomeng Zhang, Beijing (CN); Wenbo Song, Beijing (CN); Fasheng Zou, Beijing (CN); Huijie Hu, Beijing (CN); Dezhan Li, Beijing (CN); Lusheng Wang, Beijing (CN); Mengyao Zhao, Beijing (CN); Qi Zhang, Beijing (CN); Zhenjie Liu, Beijing (CN); Hao Yuan, Beijing (CN)

(73) Assignees: CHINA PETROLEUM & CHEMICAL CORPORATION, Beijing (CN); BEIJING RESEARCH INSTITUTE OF CHEMICAL INDUSTRY, Beijing (CN); CHINA PETROLEUM & CHEMICAL CORPORATION, Beijing (CN)

( * ) Notice: Subject to any disclaimer, the term of this patent is extended or adjusted under 35 U.S.C. 154(b) by 777 days.

(21) Appl. No.: 18/042,481

(22) PCT Filed: Aug. 20, 2021

(86) PCT No.: PCT/CN2021/113834
§ 371 (c)(1),
(2) Date: Feb. 22, 2023

(87) PCT Pub. No.: WO2022/042447
PCT Pub. Date: Mar. 3, 2022

(65) Prior Publication Data
US 2023/0323099 A1 Oct. 12, 2023

(30) Foreign Application Priority Data
Aug. 27, 2020 (CN) ......................... 202010878381.9
Aug. 27, 2020 (CN) ......................... 202010879646.7

(51) Int. Cl.
*C08L 23/12* (2006.01)

(52) U.S. Cl.
CPC .................................. *C08L 23/12* (2013.01)

(58) Field of Classification Search
CPC ...................................................... C08L 23/12
USPC ......................................................... 524/528
See application file for complete search history.

(56) References Cited

U.S. PATENT DOCUMENTS

| | | | |
|---|---|---|---|
| 5,286,552 | A | 2/1994 | Lesca et al. |
| 6,300,415 | B1 | 10/2001 | Okayama et al. |
| 2006/0182987 | A1 | 8/2006 | Yu et al. |
| 2013/0005902 | A1 | 1/2013 | Doshev et al. |
| 2015/0175790 | A1 | 6/2015 | Kim et al. |
| 2017/0313865 | A1 | 11/2017 | Wang et al. |
| 2017/0313866 | A1 | 11/2017 | Wang et al. |
| 2020/0048443 | A1 | 2/2020 | Gahleitner et al. |

FOREIGN PATENT DOCUMENTS

| | | | |
|---|---|---|---|
| CN | 1091748 | | 9/1994 |
| CN | 1321178 | A | 11/2001 |
| CN | 1330086 | A | 1/2002 |
| CN | 101343393 | A | 1/2009 |
| CN | 101624459 | A | 1/2010 |
| CN | 102086284 | A | 6/2011 |
| CN | 104448537 | A | 3/2015 |
| CN | 104448538 | A | 3/2015 |

(Continued)

OTHER PUBLICATIONS

Extended European Search Report in European Patent Application No. 21860284.5, dated Sep. 13, 2024.
International Search Report and Written Opinion in counterpart PCT Application No. PCT/CN2021/113834, mailed Nov. 18, 2021.
S. Feng et al., Research and industrialization of high gloss & impact resistant polypropylene, *Modern Plastics Processing and Applications*, vol. 31, No. 5, pp. 39-41 (2019).

(Continued)

*Primary Examiner* — Deve V Hall
(74) *Attorney, Agent, or Firm* — FINNEGAN, HENDERSON, FARABOW, GARRETT & DUNNER LLP

(57) ABSTRACT

A polypropylene composition, a preparation method therefor, and an article made therefrom, the polypropylene composition comprising: (a) 70-95% by weight of a crystalline homo-polypropylene having a isotactic pentad fraction of 96% or more and forming a continuous matrix phase in the polypropylene composition; (b) 5-30% by weight of an ethylene-propylene elastic copolymer containing 20-35% by weight of an ethylene structure unit and 65-80% by weight of a propylene structure unit, and forming a dispersed rubber phase in the continuous matrix phase, such that the rubber phase can at least partially deform under an orientation force and form an orientation state structure, wherein the ratio of melt mass flow rate measured at 230° C. and a 2.16 kg load of the crystalline homo-polypropylene and the polypropylene composition is 0.5-2.0. The polypropylene composition and article have a high gloss and good mechanical properties, and the preparation method is simple, low in cost and environmentally friendly; and the article can be used in electric appliances, homes, packaging, automobiles, toys, or the medical field.

44 Claims, 4 Drawing Sheets

(56) References Cited

FOREIGN PATENT DOCUMENTS

| | | | | | |
|---|---|---|---|---|---|
| CN | 104558811 | A | | 4/2015 | |
| CN | 105623078 | | | 6/2016 | |
| CN | 105623079 | | | 6/2016 | |
| CN | 106366431 | A | | 2/2017 | |
| CN | 107629155 | | | 1/2018 | |
| CN | 107629156 | | | 1/2018 | |
| CN | 106608934 | B | | 3/2019 | |
| CN | 109422958 | A | | 3/2019 | |
| CN | 109422959 | | | 3/2019 | |
| EP | 0444671 | A2 | | 9/1991 | |
| JP | H0987478 | A | | 3/1997 | |
| JP | H10158330 | A | | 6/1998 | |
| JP | H10195154 | A | | 7/1998 | |
| JP | 2002249626 | A | | 9/2002 | |
| JP | 2010500468 | A | | 1/2010 | |
| JP | 2010209225 | A | | 9/2010 | |
| JP | 2011132294 | A | | 7/2011 | |
| KR | 20010109865 | A | * | 12/2001 | |
| RU | 2342411 | C2 | | 12/2008 | |
| WO | 9719135 | A1 | | 5/1997 | |
| WO | 9846677 | A1 | | 10/1998 | |
| WO | 2005014713 | A1 | | 2/2005 | |
| WO | WO-2021037590 | A1 | * | 3/2021 | .............. C08L 23/14 |

OTHER PUBLICATIONS

Hirano, K. et al., Morphological Analysis of the Tiger Stripe on Injection Molding of Polypropylene/Ethylene-Propylene Rubber/Talc Blends Dependent on Based Polypropylene Design, *Journal of Applied Polymer Science*, vol. 104, No. 1, pp. 192-199 (2007).

Maeda, S. et al., Morphologies and Rheological Properties of Ethylene-Propylene Block Copolymers, *Journal of the Society of Rheology*, vol. 35, No. 4, pp. 213-219 (2007).

Maeda, S. et al., Morphologies and Rheological Properties of Ethylene-Propylene Block Copolymer/Ethylene-Propylene Rubber Blends, *Journal of the Society of Materials Science*, vol. 56, No. 1, pp. 13-20 (2007).

Maeda, S., Microstructure and Rheological Properties of Immiscible Polymer Blends Adjusted by Melt Blending, *Kyoto University*, No. 12266, pp. 140-147 (2008).

Japan Institute for Promoting Invention and Innovation, Application System of Olefin Polymerization Catalysts, *ISBN 4-8271-0431-X C3050*, pp. 234-238, 243 (1995).

Japanese Industrial Standards Committee, Test Method for Izod Impact Strength of Plastics, *JIS K 7110*, Cover page, pp. 3-5 (1999).

Japanese Industrial Standards Committee, Calculation Method for Charpy Impact Properties of Plastics—Part 1: Non-Instrumented Impact Test, *JIS K 7111-1*, Cover page, pp. 3-5 (2012).

* cited by examiner

POLYPROPYLENE COMPOSITION, PREPARATION METHOD THEREFOR, AND ARTICLE MADE THEREFROM

CROSS-REFERENCE TO RELATED APPLICATION

This is a national stage application of International Application No. PCT/CN2021/113834, filed Aug. 20, 2021, which claims priority to and benefits of Chinese Patent Application Nos. 202010878381.9, and 202010879646.7, filed Aug. 27, 2020, all of which are incorporated herein by reference.

TECHNICAL FIELD

The present invention belongs to the field of polyolefins, and in particular relates to a polypropylene composition, a method for the preparation of the polypropylene composition, and articles prepared from the polypropylene composition.

BACKGROUND ART

Polypropylene resin is widely used in the home appliance and automobile industries. Its advantages lie in that it not only can replace metals and engineering plastics, but also has the characteristics of easy recycling, light weight and relatively low price. These application fields require the materials to have both excellent mechanical properties (rigidity and toughness) and ideal gloss to obtain the aesthetic effect of the article. High-gloss polypropylene is currently gradually replacing HIPS, ABS and other materials, and is used in various fields such as the housings of rice cookers, electric kettles, microwave ovens, vacuum cleaners, washing machines and other home appliances, as well as automotive interior parts, children's toys, and home storage.

In addition, due to the good mechanical properties and chemical stability of polypropylene materials, the technology of using them to make medical disposable syringes is becoming more and more mature. With the development of society, the demand for flushing syringes also increases. Flushing syringes need to be pre-filled with liquid medicine, and need to be resistant to high temperature steam sterilization without deformation. Polypropylene is required to have properties of high heat deformation temperature, high modulus, high impact resistance, high gloss, and low haze.

Both homopolymerized and random copolymerized polypropylenes have high gloss, but poor impact property, thus cannot meet the occasions that require high rigidity and toughness. Although the mechanical properties of homopolymerized and random copolymerized polypropylenes can be improved by adding elastomers such as POE, the gloss will be affected, and the modification process is complicated and costly.

Impact polypropylene has a multi-phase structure, so its rigidity and toughness are ideal, and can have high modulus and high impact resistance at the same time. However, due to the existence of rubber phase, the haze of the article made thereof is usually high, and the gloss is relatively low, which cannot meet the high gloss requirement, i.e., gloss of >80% (60° angle gloss). In addition, due to its own multi-phase structure, impact polypropylene cannot have its glossiness significantly improved by adding a nucleating agent, by changing processing conditions, etc., and it must be adjusted and optimized based on its own structure.

CN104448538A discloses a polypropylene composition having both transparency and impact resistance. Polypropylene with good transparency usually has a high gloss. In this document, a specific ZN catalyst is selected to realize the synthesis of a polypropylene composition having a relatively high content of ethylene-propylene elastic copolymer (30-60% by weight) by continuous polymerization process. The particle size of the rubber in the transparent impact polypropylene product is very small, and the rubber phase will have certain influence on the crystallization of the homopolypropylene matrix, thereby affecting the rigidity of the polypropylene. Hence, the modulus of the transparent impact polypropylene product is usually low.

CN109422958A discloses a high-fluidity, high-rigidity and high-toughness polyolefin composition and a preparation method thereof. In the polyolefin composition, the ethylene-propylene copolymer has a high ethylene unit content of 40-50% by weight. The impact polypropylene has both good rigidity and toughness, but due to being limited by its rubber phase structure, the impact polypropylene has a low gloss (lower than 80%), and cannot reach a high gloss level.

CN1321178A discloses an impact resistant polypropylene composition having high modulus, high impact resistance, and low haze, but the rubber phase of the impact-resistant polymer is an ethylene-butene copolymer, which cannot be produced on the existing polypropylene plants in China.

Therefore, there is the need of finding a polypropylene composition that can maintain a good balance between rigidity and toughness of the impact polypropylene while having a high gloss or further having a low haze, so as to meet the requirements in specific application fields and expand the application range of polypropylene composition, and at the same time, said polypropylene composition should be producible on the existing industrial plants.

DISCLOSURE OF THE INVENTION

Summary of the Invention

In view of the prior art as described above, it is an object of the present invention to provide a polypropylene composition which has both high gloss and good impact resistance, in particular, the combination of high gloss, high rigidity, high toughness and low shrinkage properties.

Another object of the present invention is to provide a method for the preparation of said polypropylene composition, which can be carried out on existing industrial plants, in particular can obtain said polypropylene composition directly by a continuous polymerization process. The method does not require complicated modification and is thus simple, low in cost and environmentally friendly.

According to the present invention, by adopting a specific catalyst system and adjusting specific polymerization process conditions, a composition of a homopolypropylene having high stereoregularity and an ethylene-propylene elastic copolymer with a specific constitution is obtained, wherein the composition has a specific microstructure comprising homopolypropylene continuous matrix phase and ethylene-propylene elastic copolymer rubber phase dispersed therein, thereby the above objects are achieved.

Thus according to a first aspect, the present invention provides a polypropylene composition comprising:

(a) 70-95% by weight of a crystalline homopolypropylene as component A, with an isotactic pentad fraction of 96% or more, preferably 97% or more; wherein the crystalline homopolypropylene forms a continuous matrix phase in the polypropylene composition; and (b) 5-30% by weight of an ethylene-propylene elastic copolymer as component B, wherein based on the total weight of the ethylene-propylene elastic copolymer, the ethylene-propylene elastic copolymer contains 20-35% by weight, preferably 25-35% by weight of ethylene structural units, and 65-80% by weight, preferably 65-75% by weight of propylene structural units; the ethylene-propylene elastic copolymer forms a dispersed rubber phase in said continuous matrix phase;

wherein the ratio of the melt mass flow rate of the crystalline homopolypropylene to that of the polypropylene composition measured at 230° C. under a load of 2.16 kg according to GB/T 3682.1-2018 is 0.5-2.0, preferably 0.9-1.5.

According to a second aspect, the present invention provides a method for the preparation of the polypropylene composition described in the first aspect of the present invention, comprising the following steps:

(1) under the first olefin polymerization conditions, contacting and reacting propylene monomers with a stereoselective Ziegler-Natta catalyst, and removing the unreacted monomers from the mixture obtained after the contacting and reacting to obtain product a, said product a comprising component A; and (2) under the second olefin polymerization conditions, contacting and reacting ethylene monomers and propylene monomers with the product a as obtained in step (1) under gas phase, and removing the unreacted monomers from the mixture obtained after the contacting and reacting to obtain product b comprising component A and component B as the polypropylene composition.

According to a third aspect, the present invention provides an article prepared from the polypropylene composition of the first aspect.

Other aspects and beneficial effects of the present invention will be apparent from the following parts of Detailed description of the invention and Examples in combination with Drawings.

DETAILED DESCRIPTION OF THE INVENTION

Figure 1:
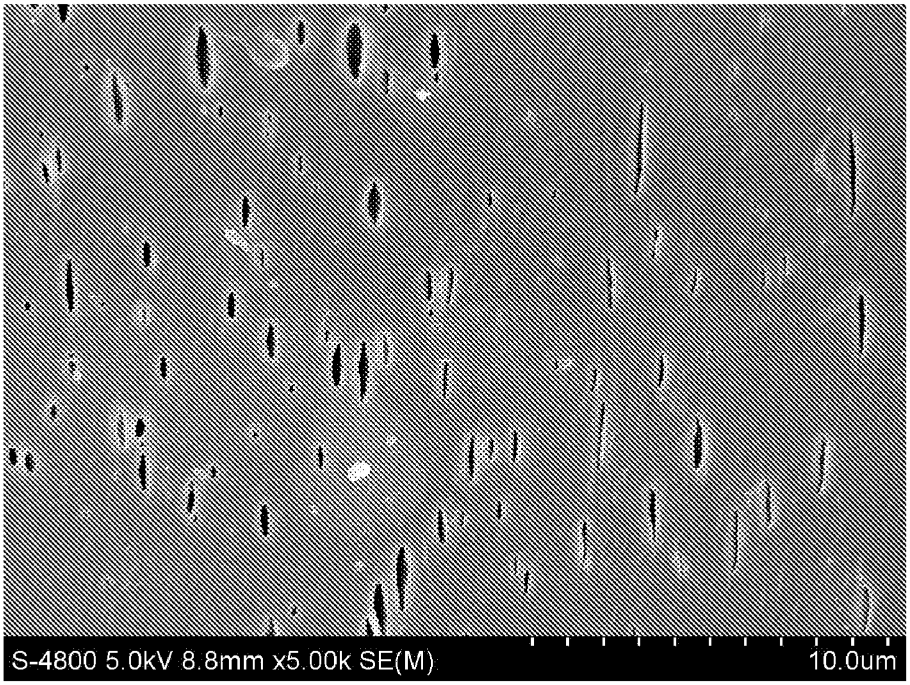
FIG. 1 shows the SEM photograph of the injection molded specimen of Example A1 at a position within 10% of the thickness from the article surface.

In a first aspect, the present invention provides a polypropylene composition comprising:

(a) 70-95% by weight of a crystalline homopolypropylene as component A, with an isotactic pentad fraction of 96% or more, preferably 97% or more; wherein the crystalline homopolypropylene forms a continuous matrix phase in the polypropylene composition; and (b) 5-30% by weight of an ethylene-propylene elastic copolymer as component B, wherein based on the total weight of the ethylene-propylene elastic copolymer, the ethylene-propylene elastic copolymer contains 20-35% by weight, preferably 25-35% by weight of ethylene structural units, and 65-80% by weight, preferably 65-75% by weight of propylene structural units; the ethylene-propylene elastic copolymer forms a dispersed rubber phase in said continuous matrix phase;

wherein the ratio of the melt mass flow rate of the crystalline homopolypropylene to that of the polypropylene composition measured at 230° C. under a load of 2.16 kg according to GB/T 3682.1-2018 is 0.5-2.0, preferably 0.9-1.5.

Component A in the polypropylene composition of the present invention is crystalline homopolypropylene, and its isotactic pentad fraction is more than 96%, preferably more than 97%, such as 97.1%, 97.2%, 97.3%, 97.4%, 97.5%, 97.6%, 97.7%, 97.8%, 97.9%, 98.0%, 98.5%, 99.0%, and the ranges formed by these numerical points. The crystalline homopolypropylene is a highly crystalline homopolypropylene.

The isotactic pentad fraction is determined by $^{13}C$ NMR, and the solvent used is deuterated o-dichlorobenzene.

The crystalline homopolypropylene forms a continuous phase in the polypropylene composition, which phase is the matrix phase, also named as "base phase". The matrix phase is essentially formed from component A.

Component B in the polypropylene composition of the present invention is an ethylene-propylene elastic copolymer.

Based on the total weight of the ethylene-propylene elastic copolymer, the ethylene-propylene elastic copolymer contains 20-35% by weight, preferably 25-35% by weight of ethylene structural units and 65-80% by weight, preferably 65-75% by weight propylene structural units.

The ethylene-propylene elastic copolymer is dispersed in said continuous matrix phase and forms a rubber phase, which rubber phase is the dispersed phase. The rubber phase is essentially formed from component B.

The morphology of the rubber phase formed from the ethylene-propylene elastic copolymer in the polypropylene composition of the present invention is similar to that of the rubber phase obtained by conventional methods. When no orientation force acts, the rubber phase in the polypropylene composition of the present invention is spherical or nearly spherical particles. The spherical shape and the nearly spherical shape mean that the aspect ratio of the rubber phase particles is substantially in the range of 1 to 2. "Substantially" means that at least 90% of the rubber phase particles have an aspect ratio in the range of 1 to 2. The aspect ratio is the ratio of the longest dimension of the particle (the distance between the two farthest points on the particle contour, i.e., the longitudinal axis) to the length between the intersection points of the straight line having the longest distance between the intersection points intersecting the particle contour (transverse axis) among the straight lines perpendicular to the longitudinal axis. Preferably, at least 95% of the rubber phase particles have an aspect ratio of 1 to 2 without the action of an orientation force.

The size of the rubber phase obtained in the present invention is smaller than that of the rubber phase obtained by conventional methods. The rubber phase particles in the polypropylene composition of the present invention may have an average size of 0.03-3.0 μm, preferably 0.05-2.0 μm, more preferably 0.05-1.5 μm, and more preferably 0.1-1.5 μm without the action of an orientation force.

The average size of the rubber phase particles is determined by scanning electron microscopy (SEM) method. Specifically, for spherical rubber phase particles, the diameter of rubber phase particle in the SEM photograph is determined; for rubber phase particles that are nearly spherical or on which orientation force has acted, the longest dimension of the particle (the distance between the two farthest points on the particle contour) is measured. The average value of the above sizes of 50 rubber phase particles is obtained by observing SEM photograph as the average size of the rubber phase or the average size of the rubber phase particles. When measuring the average size of the rubber phase particles after the action of the orientation force, the observation surface of the SEM is parallel to the direction of the orientation force (external field force), such as the injection molding direction.

In addition, unlike conventional rubber phase, the rubber phase in the polypropylene composition of the present invention can be deformed at least partially (or even completely) under the action of orientation force and form an oriented structure. After the orientation force is removed and the sample is shaped, the rubber phase can still maintain the oriented structure.

The orientation force refers to an external field force that can cause an object to be oriented, and the orientation refers to the parallel alignment of the object along the direction of the external field force. The external field force may be tensile stress and/or shear stress, for example, the force applied to the polypropylene composition by the process of preparing an article per se, such as the force applied to the polypropylene composition during injection molding and other processing processes.

Herein, the term "oriented structure" means that the longitudinal axes formed by deformation and elongation of the rubber phase particles under the action of the orientation force are aligned parallel to each other along a certain direction. Herein, a small amount of rubber phase particles arranged in a different direction and located in local areas of the composition, which are inconsistent with the overall alignment direction of the rubber phase particles in the entire composition due to the preparation process, are excluded.

Herein, the term "parallel alignment" encompasses the case of being substantially parallel, in which the angle between the longitudinal axes of the rubber phase particles is less than about 10 degrees, preferably less than about 5 degrees.

Preferably, after the orientation force acts, at least 80% of the rubber phase particles form an oriented structure, based on the total number of rubber phase particles in the SEM photograph. The rubber phase particles that cannot be clearly observed due to the preparation process or SEM method are excluded here.

After the orientation force acts, at least 50% of the rubber phase particles in the polypropylene composition of the present invention can have an aspect ratio of greater than 2, based on the total number of rubber phase particles in the SEM photograph.

After the orientation force acts, the rubber phase in the polypropylene composition of the present invention can not only be deformed and oriented at the surface layer of the composition (for example, at a position of the injection molded specimen within 10% of the thickness from the article surface, i.e., the region having a distance from the article surface of less than or equal to 10% of the thickness), but also can be deformed and oriented inside the composition, while merely the rubber phase inside the composition, particularly at the core part of the injection molded specimen beyond 10% of the thickness from the article surface (the region having a distance from the article surface of greater than 10% of the thickness), is less prone to deformation and orientation. When the ratio of the melt mass flow rate of the crystalline homopolypropylene to that of the polypropylene composition is close to 1, deformation and orientation of the rubber phase at the core part can advantageously be easily achieved.

In the polypropylene composition of the present invention, the ratio of the melt mass flow rate of the crystalline homopolypropylene to the polypropylene composition measured at 230° C. under a load of 2.16 kg according to GB/T 3682.1-2018 can be 0.5-2.0, preferably 0.9-1.5.

The crystalline homopolypropylene forming the matrix phase may have a melt mass flow rate of 5-200 g/10 min, preferably 10-100 g/10 min at 230° C. under a load of 2.16 kg according to GB/T 3682.1-2018.

The polypropylene composition may have a melt mass flow rate of 5-100 g/10 min, preferably 6-30 g/10 min, more preferably 8.89-30 g/10 min at 230° C. under a load of 2.16 kg according to GB/T 3682.1-2018.

The intrinsic viscosity of the polypropylene composition according to the invention may be 1.0-2.5 dL/g, preferably 1.4-2.4 dL/g, more preferably 1.52-2.08 dL/g. The intrinsic viscosity of xylene solubles in the polypropylene composition may be 1.0-4.0 dL/g, preferably 1.11-3.65 dL/g. The ratio of the intrinsic viscosity of xylene solubles to the intrinsic viscosity of the crystalline homopolypropylene in the polypropylene composition is preferably 0.7-2.6. The intrinsic viscosity is determined by a capillary detector.

The molecular weight distribution Mw/Mn of the polypropylene composition is preferably ≤5, more preferably the molecular weight distribution Mw/Mn is ≤4.5. The molecular weight distribution is determined by gel permeation chromatography (GPC) analysis relative to polystyrene standards.

According to one embodiment, the polypropylene composition according to the present invention may further comprise: (c) a nucleating agent as component C, thereby mechanical properties may advantageously be further improved. The nucleating agent can be at least one selected from the group consisting of carboxylic acids and their metal salts, sorbitol, aryl phosphates, dehydroabietic acid and its salts, aromatic amides, aromatic amines, rare earth compounds, condensed ring compounds having a quasi-planar structure, and polymeric nucleating agents. The nucleating agent is preferably carboxylate nucleating agent and/or aryl phosphate nucleating agent, for example Millad HPN-20E nucleating agent, Millad HPN-715 nucleating agent, and Millad 600EI nucleating agent (available from Milliken Company, USA).

Based on the total weight of the polypropylene composition, the content of the nucleating agent may be 0.05-0.3 wt %. Based on the total weight of component A and component B, the content of the nucleating agent as component C may be 0.05 to 3% by weight.

The polypropylene composition according to the present invention may also comprise other auxiliaries conventionally used in the polymer field, thereby imparting further advantageous properties to the polypropylene composition of the present invention. The other auxiliaries can be at least one selected from the group consisting of antioxidants, antistatic agents and colorants. Based on the total weight of the polypropylene composition, the content of the other auxiliaries may be 0.05-0.6% by weight, preferably 0.1-0.3% by weight.

The polypropylene composition according to the present invention has a significantly higher gloss, and its 60° angle gloss may reach ≥80%, preferably ≥85%, more preferably ≥90%. In a preferred embodiment, the polypropylene composition can also simultaneously have a haze of ≤50%, more preferably a haze of ≤40%, so as to have both a high gloss and a high transparency.

The polypropylene composition according to the present invention additionally has good mechanical properties, in particular one or more, preferably all of the following properties:

1) parallel shrinkage ratio of ≤1.15, preferably ≤1.1;
2) vertical shrinkage ratio of ≤1.36, preferably ≤1.15;
3) flexural modulus of ≥1000 MPa, preferably ≥1300 MPa, more preferably ≥1400 MPa, even more preferably ≥1450 MPa;
4) Charpy notched impact strength at room temperature of ≥5 $kJ/m^2$, preferably ≥6 $kJ/m^2$; and
5) heat deformation temperature of ≥90° C., preferably ≥92° C.

Herein, the 60° angle gloss is obtained by measuring injection molded specimen according to GB/T 8807-1988, and the specimen thickness is 2 mm. The haze is obtained by measuring injection molded specimen according to GB/T 2410-2008, and the specimen thickness is 1 mm. The shrinkage ratio is obtained by measuring injection molded specimen according to GB/T17037.4-2003. The flexural modulus is obtained by measuring injection molded specimen according to GB/T9341-2008. The Charpy notched impact strength at room temperature is obtained by measuring injection molded specimen at 23° C. according to GB/T 1043.1-2008. The heat deformation temperature is obtained by measuring injection molded specimen according to GB/T 1634.2-2004.

The polypropylene composition may be in the form of powders or pellets. The pellets are obtainable, for example, by mixing and pelletizing. The mixing and pelletizing method can be various conventional methods in the art, and the present invention places no particular limitation thereon, for example, a twin-screw extruder can be used for pelletization. In the pellets of the polypropylene composition of the present invention, the rubber phase still remains spherical or nearly spherical.

In a second aspect, the present invention provides a method for preparing a polypropylene composition according to the present invention, comprising the following steps:

(1) under the first olefin polymerization conditions, contacting and reacting propylene monomers with a stereoselective Ziegler-Natta catalyst, and removing the unreacted monomers from the mixture obtained after the contacting and reacting to obtain product a, said product a comprising component A; and
(2) under the second olefin polymerization conditions, contacting and reacting ethylene monomers and propylene monomers with the product a as obtained in step (1) under gas phase, and removing the unreacted monomers from the mixture obtained after the contacting and reacting to obtain product b comprising component A and component B as the polypropylene composition.

In the method of the present invention, a stereoselective Ziegler-Natta catalyst can be used to prepare the aforementioned highly crystalline homopolypropylene with a high stereoregularity, and the homopolymer together with the active catalyst is further contacted with ethylene and propylene to form a polypropylene composition with rubber phase dispersed in homopolymer continuous matrix phase.

The stereoselective Ziegler-Natta catalyst may comprise:

(i) a solid catalyst component containing a product obtained from the reaction of a magnesium source, a titanium source and an internal electron donor;
(ii) an organoaluminum compound; and
(iii) optionally an external electron donor.

The Ziegler-Natta catalyst preferably has a high stereoselectivity.

The method of the present invention uses the solid catalyst component as the main catalyst. The amount of each ingredient in the solid catalyst component can be determined according to need. Preferably, the molar ratio of the magnesium source in terms of magnesium element, the titanium source in terms of titanium element and the internal electron donor can be 1:(20-150):(0.1-0.9), preferably 1:(30-120):(0.15-0.6).

The solid catalyst component used in the method of the present invention can be obtained commercially, or prepared by methods known in the art, e.g., the method disclosed in CN106608934B.

The titanium source can be a titanium compound, for example, one or more selected from the titanium compounds represented by the general formula $Ti(OR)_{4-m}X_m$, wherein m is an integer of 0-4, preferably an integer of 1-4, R can be a $C_1$-$C_{20}$ alkyl, preferably a $C_1$-$C_{10}$ alkyl, X can be halogen, preferably chlorine.

The magnesium source can be various magnesium-containing compounds that can be used in a catalyst for olefin polymerization, such as magnesium halide, alcoholate or halogenated alcoholate and magnesium halide adduct carrier, etc., preferably spherical magnesium halide adduct carrier, such as those prepared according to the method disclosed in Example 1 of CN1330086A or the method disclosed in CN106608934B.

The internal electron donor may preferably be selected from the group consisting of monocarboxylic acid esters, dicarboxylic acid esters, phosphoric acid ester compounds, diether compounds and combinations thereof.

In a preferred embodiment, the internal electron donor can be a monocarboxylic acid ester and/or a dicarboxylic acid ester, preferably at least one selected from the group consisting of benzoate, malonate, phthalate and succinate, more preferably phthalate. Phthalate includes alkyl phthalates (e.g., diisobutyl phthalate and/or dioctyl phthalate) and/or aryl phthalates (e.g., diphenyl phthalate and/or benzylbutyl phthalate). Preference is given to alkyl phthalates, further preference is given to diisobutyl phthalate and/or dioctyl phthalate.

In such embodiment of the method of the present invention using a monocarboxylic acid ester and/or a dicarboxylic acid ester as the internal electron donor, a nucleating agent is preferably used. The 60° angle gloss of the prepared polypropylene composition can reach ≥80%, preferably ≥85%; the parallel shrinkage ratio can be ≤1.15, and the vertical shrinkage ratio can be ≤1.15; the flexural modulus can be ≥1000 MPa, preferably ≥1300 MPa, and the Charpy notched impact strength at room temperature can be ≥5 $kJ/m^2$.

In another preferred embodiment of the method of the present invention, the internal electron donor may be an internal electron donor compounded by a phosphoric acid ester compound and a diether compound.

The molar ratio of the amount of the diether compound to that of the phosphoric acid ester compound can be 1:(0.02-0.25), preferably 1:(0.04-0.15).

The phosphoric acid ester compound can be at least one selected from the phosphoric acid ester compounds represented by formula (1), formula (1)

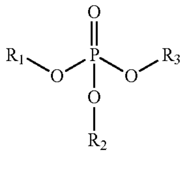

wherein $R_1$, $R_2$ and $R_3$ are each independently selected from $C_1$-$C_4$ linear or branched alkyl, $C_3$-$C_{20}$ cycloalkyl, $C_6$-$C_{20}$ aryl, $C_7$-$C_{20}$ alkaryl or $C_7$-$C_{20}$ aralkyl.

Preferably, the phosphoric acid ester compound may include but is not limited to: at least one selected from the group consisting of trimethyl phosphate, triethyl phosphate, tributyl phosphate, triphenyl phosphate, tricresyl phosphate, triisopropylphenyl phosphate, trimethoxy phenyl phosphate, phenyl dimethyl phosphate, cresyl dibutyl phosphate, cumyl dimethyl phosphate, cumyl diethyl phosphate, cumyl dibutyl phosphate, phenyl xylyl phosphate, phenyl diisopropylphenyl phosphate, p-cresyl dibutyl phosphate, m-cresyl dibutyl phosphate, p-cumyl dimethyl phosphate, p-cumyl diethyl phosphate, p-tert-butylphenyl dimethyl phosphate, o-cresyl p-di-tert-butylphenyl phosphate and the like.

The diether compound can be at least one selected from the diether compounds represented by formula (2), $$R^1R^2C(CH_2OR^3)(CH_2OR^4) \qquad \text{formula (2)}$$

wherein $R^1$ and $R^2$ are each independently selected from hydrogen, $C_1$-$C_{20}$ linear or branched alkyl, $C_3$-$C_{20}$ cycloalkyl, $C_6$-$C_{20}$ aryl, $C_7$-$C_{20}$ aralkyl or $C_7$-$C_{20}$ alkaryl, $R^3$ and $R^4$ are each independently selected from $C_1$-$C_{10}$ alkyl.

Preferably, the diether compound may include but is not limited to: at least one selected from the group consisting of 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane and 9,9-dimethoxymethylfluorene and the like.

In such embodiment of the method of the present invention using an internal electron donor compounded by a phosphoric acid ester compound and a diether compound, a nucleating agent is preferably used. The prepared polypropylene composition has a 60° angle gloss that can reach ≥85%, preferably ≥90%; at the same time, it has a haze of ≤50%, preferably a haze of ≤40%. In this embodiment, the parallel shrinkage ratio of the prepared polypropylene composition can be ≤1.15, preferably ≤1.1; the flexural modulus can be ≥1400 MPa, preferably ≥1450 MPa; the Charpy notched impact strength at room temperature can be ≥5 $kJ/m^2$, preferably ≥6 $kJ/m^2$; the heat deformation temperature can be ≥90° C., preferably the heat deformation temperature is ≥92° C.; the molecular weight distribution Mw/Mn is narrow, which can be ≤5, preferably the molecular weight distribution Mw/Mn is ≤4.5.

In the present invention, it is unexpectedly found that the polypropylene composition prepared by the catalyst system using the internal electron donor compounded by a phosphoric acid ester compound and a diether compound has a higher gloss and a lower haze and has comparable mechanical properties, and can combine the properties of good transparency, high gloss, high rigidity, high toughness and low shrinkage, thereby having both good mechanical properties and good aesthetic characteristics.

In the method of the present invention, organoaluminum compound is used as cocatalyst. It is preferably an alkylaluminum compound, including but not limited to: one or more selected from the group consisting of triethylaluminum, tri-n-butylaluminum, triisobutylaluminum, tri-n-hexylaluminum, diethylaluminum monochloride, di-n-butylaluminum monochloride, diisobutylaluminum monochloride, di-n-hexylaluminum monochloride, ethylaluminum dichloride, n-butylaluminum dichloride, isobutylaluminum dichloride and n-hexylaluminum dichloride. The alkylaluminum compound is preferably trialkylaluminum, such as at least one selected from triethylaluminum, tri-n-butylaluminum and triisobutylaluminum.

The catalyst system used in the method of the present invention may further comprise an external electron donor. The external electron donor can be an organosilicon compound, preferably an organosilicon compound having the general formula $R_nSi(OR')_{4-n}$, where $0<n\leq3$, R is selected from hydrogen atom, halogen, alkyl, cycloalkyl, aryl and haloalkyl, and R' is selected from alkyl, cycloalkyl, aryl and haloalkyl.

The external electron donor preferably may include but is not limited to: at least one selected from the group consisting of tetramethoxysilane, tetraethoxysilane, trimethylmethoxysilane, trimethylethoxysilane, trimethylphenoxysilane, dimethyldimethoxysilane, dimethyldiethoxysilane, methyl tert-butyldimethoxysilane, methylisopropyldimethoxysilane, diphenoxydimethoxysilane, diphenyldiethoxysilane, phenyltrimethoxysilane, phenyltriethoxysilane, vinyltrimethoxysilane, cyclohexylmethyldimethoxysilane, dicyclopentyldimethoxysilane, diisopropyldimethoxysilane, diisobutyldimethoxysilane, 2-ethylpiperidinyl-2-tert-butyldimethoxysilane, (1,1,1-trifluoro-2-propyl)-2-ethylpiperidinyldimethoxysilane, and (1,1,1-trifluoro-2-propyl)-methyldimethoxysilane and the like.

The organosilicon compound as the external electron donor can be added at one time to the system of two or more reactors operated in series, and can also be added in portions at different positions; it can be added to the reactor directly, or added to the equipment or pipeline related to the feeding of the reactor.

In the method of the present invention, the amount of the solid catalyst component, the organoaluminum compound and the external electron donor can also be determined according to need. The amount ratio of the solid catalyst component to the organoaluminum compound may be 1:(25-100) in terms of titanium/aluminum molar ratio. The weight ratio of the organoaluminum compound to the external electron donor may be (0-150):1, preferably (2-150):1, more preferably (3-10):1.

During preparing the catalyst used in the present invention, the organoaluminum compound and the optional external electron donor can be mixed with the solid catalyst component separately and then reacted; or the organoaluminum compound and the optional external electron donor can be pre-mixed and then mixed and reacted with the solid catalyst component.

The catalyst used in the present invention can be directly added into the reactor, or can be added into the reactor after the pre-complexation and/or pre-polymerization known in the art.

The pre-complexation and pre-polymerization processes can be carried out in an environment with or without polymerization monomers, for example, in a separately arranged pre-complexation or pre-polymerization reactor. When the pre-complexation reaction is carried out separately, the reactor can be in the form of a continuous stirred tank reactor, or other forms that can obtain sufficient mixing effect, such as a loop reactor, a section of a pipeline containing a static mixer, or even a section of a pipeline where the material is in turbulent flow. The pre-complexation temperature can be controlled between −10° C. and 60° C., preferably between 0° C. and 30° C. The pre-complexation time can be controlled at 0.1-180 min, preferably 5-30 mins.

The catalyst, with or without pre-complexation, may also optionally be subjected to a pre-polymerization treatment. The pre-polymerization can be carried out continuously under the liquid phase bulk condition, and can also be carried out batchwise in an inert solvent. The pre-polymerization reactor can be a continuous stirred tank, a loop reactor, and the like. The pre-polymerization temperature can be controlled between −10° C. and 60° C., preferably between 0° C. and 40° C. The pre-polymerization yield can be controlled at 0.5-1000 times, preferably 1.0-500 times.

In step (1) of the method of the present invention, the first olefin polymerization conditions may be liquid phase polymerization conditions or gas phase polymerization conditions, that is, the polymerization may be liquid phase polymerization or gas phase polymerization.

The liquid phase polymerization conditions may include: using hydrogen as molecular weight regulator, a polymerization temperature of 0-150° C., preferably 40-100° C.; and a polymerization pressure of higher than the saturated vapor pressure of propylene at the corresponding polymerization temperature.

The gas phase polymerization conditions may include: using hydrogen as a molecular weight regulator, a polymerization temperature of 0-150° C., preferably 40-100° C.; and a polymerization pressure of greater than or equal to normal pressure, preferably at 0.5-2.5 MPa.

The hydrogen/propylene ratio used in step (1) is preferably 0.0010-0.0060 mol/mol, that is, the hydrogen concentration is preferably 0.10-0.60 mol %.

In the gas phase polymerization reaction system of step (2) of the method of the present invention, the molar ratio of ethylene/(ethylene+propylene) can be 0.1-0.4 mol/mol, preferably 0.1-0.3 mol/mol, more preferably 0.1-0.25 mol/mol, still more preferably 0.15-0.25 mol/mol. The temperature of olefin gas phase polymerization may be 40-100° C., preferably 60-80° C. The pressure may be 0.6-1.4 MPa, preferably 1.0-1.3 MPa. In a preferred embodiment of step (2), the hydrogen/ethylene ratio is 0.02-0.70 mol/mol, preferably 0.04-0.54 mol/mol.

Herein, the pressure refers to gauge pressure.

The polymerization described in steps (1) and (2) according to the present invention can be carried out continuously or batchwise.

For continuous polymerization, two or more reactors in series can be used. Among them, the first or first few reactors are used to prepare product a, which comprises component A, in particular mainly consists of said component A. The reactor for preparing product a may be a liquid phase reactor or a gas phase reactor. The liquid phase reactor can be a loop reactor or a stirred tank reactor. The gas phase reactor can be a horizontal stirred bed reactor or a vertical stirred bed reactor or a fluidized bed reactor or a multi-zone circulation reactor, etc. The reactor following the preparation of product a is used for the preparation of product b or component B, wherein said product b comprises component A and component B, in particular mainly consists of components A and B. The reactor for preparing product b or component B is a gas phase reactor, which can be a horizontal stirred bed reactor, or a vertical stirred bed reactor, or a fluidized bed reactor, etc. The above gas phase reactors can also be combined arbitrarily.

The polymerization of the present invention can also be carried out batchwise. The product a and product b are prepared sequentially in the reactors. For the preparation of product a, the polymerization can be carried out either in liquid phase or in gas phase. For the preparation of product b or component B, it is necessary to carry out the polymerization in gas phase.

When the polypropylene composition of the present invention comprises a nucleating agent and optionally other auxiliaries, the nucleating agent and other auxiliaries can be added before or during step (1), or before, during or after step (2), without affecting the polymerization reaction. Preferably, the method of the present invention may further comprise step (3): subjecting the product b obtained in step (2) and a nucleating agent and optionally other auxiliaries to mixing, especially mixing and pelletizing. The mixing and pelletizing method can be various conventional methods in the art, for example, a twin-screw extruder can be used for pelletization.

In particular, in the case of the catalyst system of the internal electron donor compounded by a phosphoric acid ester compound and a diether compound, in step (3), the product b obtained in the step (2) and a nucleating agent are mixed and pelletized. The polypropylene composition thus prepared can simultaneously have a high gloss (60° angle gloss: ≥85%, preferably ≥90%) and a low haze (a haze: ≤50%, preferably ≤40%), thereby advantageously having both a high gloss and a high transparency.

The polypropylene composition prepared according to the method of the present invention can in particular achieve a combination of good mechanical properties (high rigidity, high toughness and low shrinkage properties) and aesthetic properties (high gloss, even combined with high transparency and low haze).

Compared with the catalytic system using carboxylate as the internal electron donor, the polypropylene composition prepared by using the catalyst system of the internal electron donor compounded by a phosphoric acid ester compound and a diether compound has a higher gloss and a lower haze and has comparable mechanical properties, and it can combine the properties of good transparency, high gloss, high rigidity, high toughness and low shrinkage.

Due to the above advantageous overall performance, the polypropylene composition prepared according to the method of the present invention can provide a raw material with better overall performance for the downstream processing, and can be applied to wider fields. The method for the preparation of the polypropylene composition of the present invention can be carried out on existing industrial plants, in particular by a continuous polymerization process. The preparation method is economical and convenient.

In a third aspect, the present invention provides an article prepared from a polypropylene composition according to the present invention. In the article, the rubber phase is at least partially deformed and forms an oriented structure. In a preferred embodiment, both at a position within 10% of the thickness from the article surface and at a position of the core part beyond 10% of the thickness from the article surface, the rubber phase is deformed and elongated to form an oriented structure, preferably in the article, the rubber phase is completely deformed and forms an oriented structure.

The article is preferably an injection molded article.

According to the present invention, at least a part of, preferably at least 80% of, or even the whole of the rubber phase will be deformed, elongated and form an oriented structure after being subjected to an orientation force, for example, during the preparation of an article (e.g., injection molding).

In a preferred embodiment, more than 50% of the rubber phase particles at a position within 10% of the thickness from the article surface have an aspect ratio greater than or equal to 4; and more than 50% of the rubber phase particles at a position of the core part beyond 10% of the thickness from the article surface have an aspect ratio greater than or equal to 2, based on the total number of the rubber phase particles at the corresponding position in the SEM photograph.

Therefore, the article of the present invention comprises the oriented structure having the ethylene-propylene elastic copolymer rubber phase dispersed in the continuous phase of highly crystalline homopolypropylene, thereby unexpectedly improving the gloss of the article and maintaining good mechanical properties.

The article of the present invention can be used in various fields such as home appliances, homes, packaging, toys, automobile modification, and medicine fields. For example, the article of the present invention may be a product or a part of the product used in electrical appliances, home products, packaging, toys, automobiles or medicine field, especially housings for home appliances, home storage products, toys, automotive interior parts or medical disposable syringes, for example, flushing syringes.

EXAMPLES

The present invention will be further illustrated below in conjunction with examples, but the scope of the present invention is not limited by these examples.

Measurement Methods of Parameters:

Melt mass flow rate (MFR): determined at 230° C. and under a load of 2.16 kg according to GB/T 3682.1-2018.

Gas molar ratio in the reactor: determined by gas chromatography, Vista II online chromatograph, ABB, Switzerland.

Content of xylene solubles: determined according to GB/T 24282-2009.

Tensile strength: measuring the injection molded specimen according to GB/T 1040.1-2006.

Flexural modulus: measuring the injection molded specimen according to GB/T 9341-2008.

Charpy notched impact strength: measuring the injection molded specimen at 23° C. and −20° C. according to GB/T 1043.1-2008.

Rockwell hardness: measuring the injection molded specimen according to GB/T 3398.2-2008.

Heat deformation temperature: measuring the injection molded specimen according to GB/T 1634.2-2004.

Gloss: measuring the injection molded specimen having a thickness of 2 mm according to GB/T 8807-1988.

Shrinkage ratio: measuring the injection molded specimen according to GB/T 17037.4-2003.

Haze: measuring the injection molded specimen having a thickness of 1 mm according to GB/T 2410-2008.

Molecular weight distribution (GPC analysis): determined by PL-GPC 220 high-temperature gel permeation chromatograph produced by Agilent Technologies, USA. Temperature: 150° C.; 3 PLgel 13 μm Olexis columns, 300.0 mm×7.5 mm; mobile phase: 1,2,4-trichlorobenzene (0.25 g/L antioxidant 2,6-dibutyl-p-cresol added); flow rate: 1.0 mL/min; IR5 infrared detector; sample concentration: about 1 mg/mL; and narrow distribution polystyrene standards for universal calibration.

Isotactic pentad fraction: using AVANCEIII 400 MHz NMR spectrometer from Bruker Corporation, with 10 mm probe, and deuterated o-dichlorobenzene as the solvent. About 200 mg of the sample/2.5 ml of the solvent, heating the sample tube in an oil bath at 130-140° C. until the sample was dissolved to form a homogeneous solution. Test conditions: probe temperature: 125° C.; 90° pulse; sampling time AQ: 5 seconds; and delay time D1: 10 seconds.

Ethylene structural unit content and propylene structural unit content: determined by infrared method, using Magna-IR 200 infrared spectrometer from Nicolet, USA.

SEM photographs: sample pellets, or injection molded specimens where injection molding followed the injection molding conditions according to GB/T17037.1-2019, were subjected to cooling with liquid nitrogen and then brittle fracturing, or ultrathin sectioning. The section was soaked in xylene solution to etch away the rubber phase, then the surface was cleaned. After drying, SEM test was conducted. The surface was subjected to gold spray treatment before testing. HITACHI S-4800 cold field emission scanning electron microscope from HITACHI, Japan was used.

Average size of the rubber phase particles: determined by SEM method. For spherical rubber phase particles, the diameter of rubber phase particles in the SEM photograph was determined; for rubber phase particles that were nearly spherical or on which orientation force had acted, the longest dimension of the particle (the distance between the two farthest points on the particle contour) was measured, the average value of the above sizes of 50 rubber phase particles was obtained by observing SEM photograph as the average size of the rubber phase particles. When measuring the average size of the rubber phase particles after the action of the orientation force, the SEM observation surface was parallel to the injection molding direction.

Intrinsic viscosity: determined using a capillary detector (capillary detector in the CRYSTEX instrument from PolymerChar, Spain).

Example A1

(1) Preparation of Polypropylene Composition

Polymerization reaction was carried out on a set of polypropylene pilot plant. The polymerization method and steps were as follows:

Preparation of main catalyst Cat-1: The preparation was carried out according to the method of Example 1 in CN106608934B. 150 mL of white oil (commercially available from Guangzhou Mingen Petrochemical Co., Ltd., water content of less than 50 ppm, based on weight), 300 mL of methyl silicone oil (commercially available from Dow Corning, viscosity of 300 centipoise/20° C., water content of less than 50 ppm, based on weight), 30 g of magnesium chloride containing 0.44 wt % of water (commercially available from Fushun Xinyi Titanium Plant), 50 mL of anhydrous ethanol (commercially available from Beijing Chemical Works, water content of less than 100 ppm, based on weight) and 1 mL of 2-methoxybenzoyl chloride (commercially available from TOKYO KASEI KOGYO CO. LTD) were added in a 1000 mL reaction kettle, and the temperature was increased to 125° C. under stirring. After 3 hours of reaction at a constant temperature, under a pressure of 0.3 MPa and via a discharge pipeline pre-equipped with four layers of metal meshes having a pore size of 75 μm (each layer having a thickness of 0.1 mm), the mixture was pressed into 2 L of hexane pre-cooled to −30° C. (water content of less than 5 ppm, based on weight), and quenched and formed. The liquid was removed by filtration, and the obtained solid was washed 5 times with 300 mL of hexane, and vacuum-dried at 30° C. for 1.5 hours to obtain a spherical magnesium halide adduct. In a 300 mL glass reaction flask, under nitrogen protection, 10 mL of hexane and 90 mL of titanium tetrachloride were sequentially added, and cooled to −20° C.; 8.0 g of the spherical magnesium halide adduct was added, and stirred at −20° C. for 30 minutes. Then, the temperature was slowly increased to 110° C., and 1.5 mL of diisobutyl phthalate was added during increasing the temperature. After reacting at a constant temperature of 110° C. for 30 minutes, the liquid was filtered off. 80 mL of titanium tetrachloride was added, the temperature was increased to 120° C., and the liquid was filtered off after maintaining at 120° C. for 30 minutes; then, further 80 mL of titanium tetrachloride was added, the temperature was increased to 120° C., and the liquid was filtered off after maintaining at 120° C. for 30 minutes. Finally, the obtained solid was washed 5 times with 60° C. hexane (hexane used in an amount of 80 mL/time), and vacuum-dried.

Pre-polymerization: After pre-contacting and reacting at 10° C. for 20 min, the main catalyst Cat-1 with the internal electron donor being diisobutyl phthalate, co-catalyst (triethylaluminum), and external electron donor diisopropyldimethoxysilane (DIPMS) were continuously added to a pre-polymerization reactor for pre-polymerization reaction, wherein the flow rate of triethylaluminum (TEAL) was 6 g/hr, the flow rate of diisopropyldimethoxysilane was 1.2 g/hr, and the flow rate of the main catalyst was 0.36 g/hr. The pre-polymerization was carried out in a propylene liquid phase bulk environment, wherein the temperature was 15° C., and the residence time was about 4 minutes.

After the pre-polymerization, the catalyst was fed to a loop reactor continuously, where propylene homopolymerization reaction was completed. The temperature of the loop polymerization reaction was 70° C., the reaction pressure was 4.0 MPa, hydrogen gas was led to the feed of the loop reactor, the hydrogen concentration detected by online chromatograph was 0.15 mol %, and correspondingly, the hydrogen/propylene ratio was 0.0015 mol/mol.

After the reaction in the loop reactor, the obtained material was fed to a fluidized bed gas phase reactor for the copolymerization reaction of ethylene and propylene. The temperature of the gas phase reaction was 70° C., and the reaction pressure was 1.1 MPa, wherein ethylene/(propylene+ethylene) was equal to 0.21 (mol/mol). A specific amount of hydrogen gas was led to the feed of the gas phase reactor, and the hydrogen/ethylene in the recycled gas of the gas phase reactor as detected by online chromatograph was equal to 0.13 (mol/mol). The specific process conditions are shown in Table 1.

The polymer obtained by the reaction was subjected to degassing and deactivation treatment with wet nitrogen to obtain a polypropylene composition.

The obtained polypropylene composition had an ethylene content in component B of 31.0% by weight and a ratio of the MFR of component A to the MFR of the composition of 1.08.

(2) Preparation of Polypropylene Pellets and Injection Molded Specimen 0.1% by weight of IRGAFOS 168 (BASF, Germany), 0.1% by weight of IRGANOX 1010 (BASF, Germany), 0.05% by weight of calcium stearate and 0.04% by weight of Millad HPN-20E nucleating agent (Milliken, USA) were added to the polypropylene composition obtained by polymerization, followed by pelletization with a twin-screw extruder. Then injection molded specimens that met GB standards were prepared using an injection molding machine. They were determined for their physical properties.

The determination results are shown in Table 2.

Figure 2:
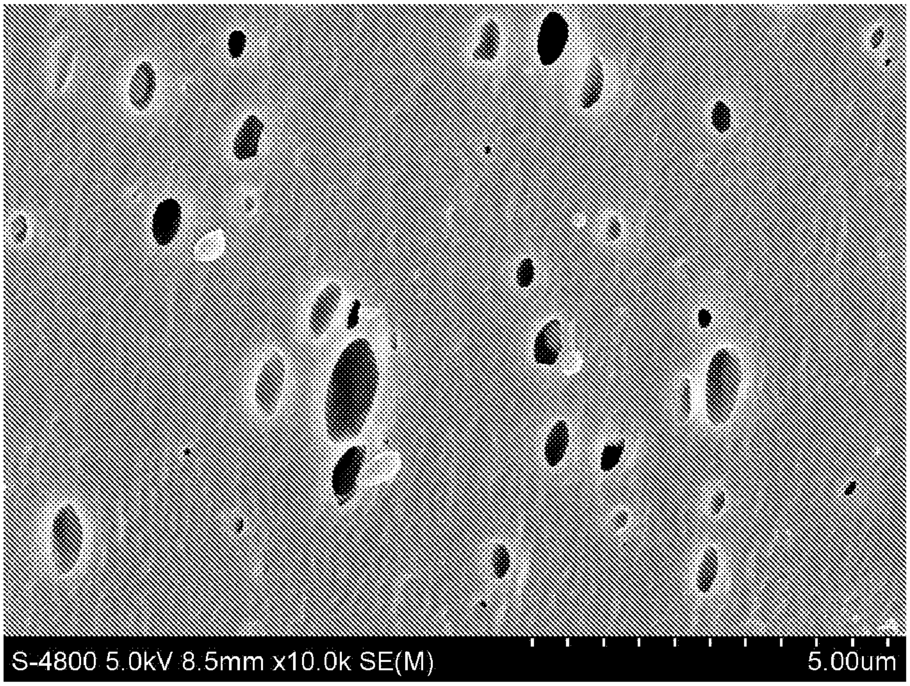
FIG. 2 shows the SEM photograph of the injection molded specimen of Example A1 at a position of the core part beyond 10% of the thickness from the article surface.
Figure 3:
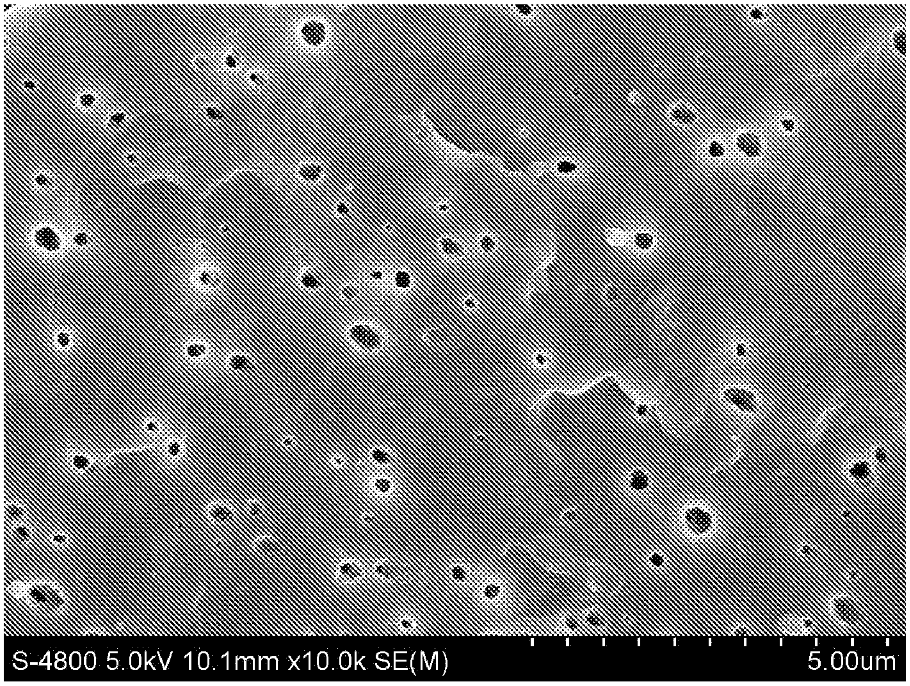
FIG. 3 shows the SEM photograph of the extrudate of the melting flow rate test of Example A1, which can be considered as close to the SEM photograph of pellets.

FIG. 1-FIG. 3 showed the SEM photographs of the pellets and injection molded specimen prepared in Example A1. From these SEM photographs, it could be seen that after injection molding, the rubber phase in the injection molded specimen of Example A1 presented an obvious orientated structure, and both at a position of the injection molded specimen within 10% of the thickness from the article surface and at a position of the core part beyond 10% of the thickness from the article surface, the rubber phase was deformed, and elongated and oriented along a certain direction, while the degree of deformation of the rubber phase at a position within 10% of the thickness from the article surface was higher (at a position within 10% of the thickness from the article surface: more than 70% of the rubber phase particles had an aspect ratio of greater than 4, and some rubber phase particles even had an aspect ratio of greater than 7; at a position of the core part beyond 10% of the thickness from the article surface: more than 50% of the rubber phase particles had an aspect ratio of greater than 2). In addition, it could also be seen that the rubber phase in the pellets before injection molding was substantially spherical. Therefore, the action of the orientation force applied during injection molding caused the rubber phase to be deformed and form an orientated structure, and after the orientation force was removed and the sample was formed, the rubber phase maintained the orientated structure.

Example A2

Example A2 used the same catalyst system, nucleating agent and polymerization process conditions as those in Example A1, except that the hydrogen concentration in the loop reactor was 0.21 mol %, and the hydrogen/ethylene=0.1 (mol/mol) in the gas phase reactor. The specific process conditions are shown in Table 1. The resulting polypropylene composition had an ethylene content in component B of 31.1% by weight and a ratio of the MFR of component A to the MFR of the composition of 1.28.

The property determination results of the obtained injection molded specimen are shown in Table 2.

SEM analysis showed that after injection molding, the rubber phase in the injection molded specimen of Example A2 presented an obvious orientated structure.

Example A3

Example A3 used the same catalyst system, nucleating agent and polymerization process conditions as those in Example A1, except that in the gas phase reactor, the hydrogen/ethylene=0.14 (mol/mol), and ethylene/(ethylene+propylene)=0.25 (mol/mol). The specific process conditions are shown in Table 1. The resulting polypropylene composition had an ethylene content in component B of 34.89% by weight and a ratio of the MFR of component A to the MFR of the composition of 0.93.

The determination results of the properties of the obtained injection molded specimen are shown in Table 2.

SEM analysis showed that after injection molding, the rubber phase in the injection molded specimen of Example A3 presented an obvious orientated structure.

Example A4

Example A4 used the same catalyst system, nucleating agent and polymerization process conditions as those in Example A1, except that the hydrogen concentration in the loop reactor was 0.23 mol %, and in the gas phase reactor, the hydrogen/ethylene=0.02 (mol/mol). The specific process conditions are shown in Table 1. The resulting polypropylene composition had an ethylene content in component B of 31.2% by weight and a ratio of the MFR of component A to the MFR of the composition of 1.81.

The determination results of the properties of the obtained injection molded specimen are shown in Table 2.

SEM analysis showed that after injection molding, the rubber phase in the injection molded specimen of Example A4 presented an obvious orientated structure.

Example A5

Example A5 used the same catalyst system, nucleating agent and polymerization process conditions as those in Example A1, except that the hydrogen concentration in the loop reactor was 0.26 mol %, and in the gas phase reactor, the ethylene/(propylene+ethylene)=0.19 (mol/mol), and the hydrogen/ethylene=0.35 (mol/mol). The specific process conditions are shown in Table 1.

The resulting polypropylene composition had an ethylene content in component B of 30.96% by weight and a ratio of the MFR of component A to the MFR of the composition of 1.14.

The determination results of the properties of the obtained injection molded specimen are shown in Table 2.

SEM analysis showed that after injection molding, the rubber phase in the injection molded specimen of Example A5 presented an obvious orientated structure.

Example A6

Example A6 used the same catalyst system, nucleating agent and polymerization process conditions as those in Example A1, except that the hydrogen concentration in the loop reactor was 0.60 mol %, and in the gas phase reactor, the hydrogen/ethylene=0.04 (mol/mol). The specific process conditions are shown in Table 1.

The resulting polypropylene composition had an ethylene content in component B of 31.67% by weight and a ratio of the MFR of component A to the MFR of the composition of 1.85.

The determination results of the properties of the obtained injection molded specimen are shown in Table 2.

SEM analysis showed that after injection molding, the rubber phase in the injection molded specimen of Example A6 presented an obvious orientated structure.

Comparative Example A1

Comparative Example A1 used the same catalyst system, nucleating agent and polymerization process conditions as those in Example A1, except that the hydrogen concentration in the loop reactor was 0.28 mol %, and in the gas phase reactor, the ethylene/(propylene+ethylene)=0.45 (mol/mol), and the hydrogen/ethylene=0.01 (mol/mol). The specific process conditions are shown in Table 1.

The resulting polypropylene composition had an ethylene content in component B of 48.61% by weight and a ratio of the MFR of component A to the MFR of the composition of 2.49.

The determination results of the properties of the obtained injection molded specimen are shown in Table 2.

Comparative Example A2

Comparative Example A2 used the same catalyst system, nucleating agent and polymerization process conditions as those in Example A1, except that the hydrogen concentration in the loop reactor was 0.70 mol %, and in the gas phase reactor, the ethylene/(propylene+ethylene)=0.45 (mol/mol), and the hydrogen/ethylene=0.02 (mol/mol). The specific process conditions are shown in Table 1.

The resulting polypropylene composition had an ethylene content in component B of 48.58% by weight and a ratio of the MFR of component A to the MFR of the composition of 2.34.

The determination results of the properties of the obtained injection molded specimen are shown in Table 2.

Figure 6:
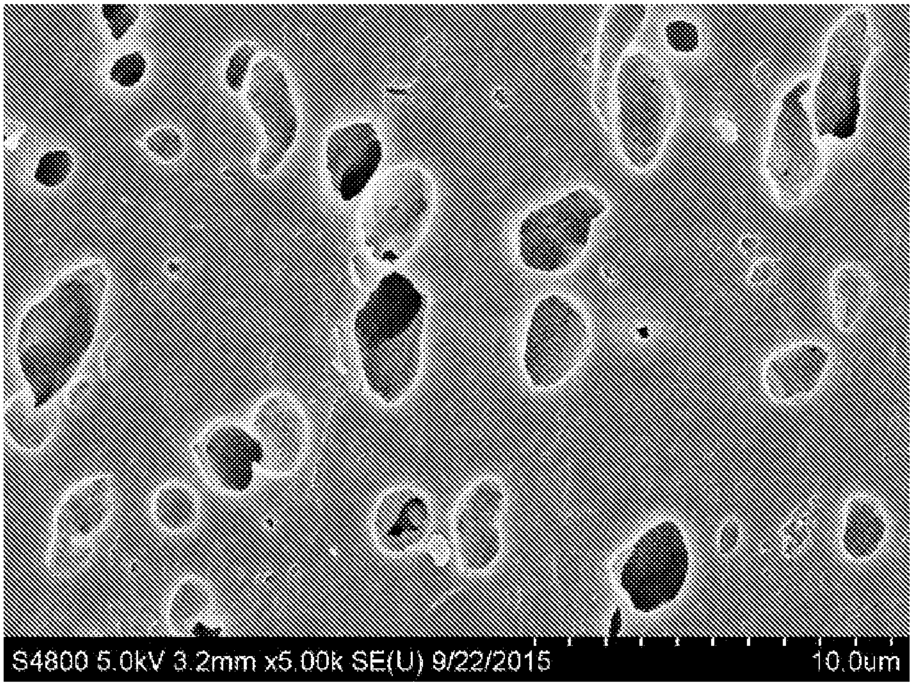
FIG. 6 shows the SEM photograph of the injection molded specimen of Comparative Example A2 at a position of the core part beyond 10% of the thickness from the article surface.
Figure 7:
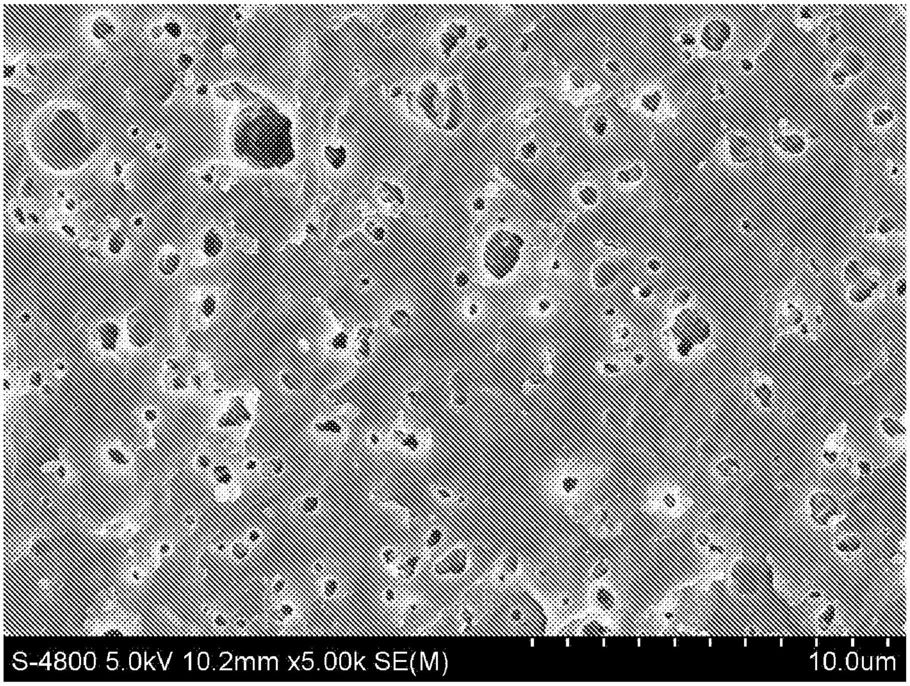
FIG. 7 shows the SEM photograph of the pellets of Comparative Example A2.

FIG. 6 and FIG. 7 showed the SEM photographs of the injection molded specimen and pellets of Comparative Example A2. It could be seen from these photographs that even after injection molding, the rubber phase in the injection molded specimen of Comparative Example A2 was still substantially spherical, without deformation and orientation, particularly, at a position of the core part beyond 10% of the thickness from the article surface, where no tendency to deformation or orientation was seen.

TABLE 1

| | | | Examples and Comparative examples | | | | | | | |
|---|---|---|---|---|---|---|---|---|---|---|
| | | | Example A1 | Example A2 | Example A3 | Example A4 | Example A5 | Example A6 | Comparative Example A1 | Comparative Example A2 |
| Liquid phase reactor | Temperature | ° C. | 70 | 70 | 70 | 70 | 70 | 70 | 70 | 70 |
| | Pressure | MPa | 4.0 | 4.0 | 4.0 | 4.0 | 4.0 | 4.0 | 4.0 | 4.0 |
| | Hydrogen/propylene ratio | mol/mol | 0.0015 | 0.0021 | 0.0015 | 0.0023 | 0.0026 | 0.0060 | 0.0028 | 0.0070 |
| | MFR (component A) | g/10 min | 10.1 | 15.0 | 10.0 | 16.1 | 22.0 | 48.0 | 25.1 | 61.9 |
| | Component A | wt. % | 92.34 | 92.35 | 92.32 | 87.10 | 89.44 | 84.46 | 92.28 | 84.96 |
| | Intrinsic viscosity | dL/g | 1.95 | 1.72 | 1.96 | 1.70 | 1.54 | 1.27 | 1.53 | 1.25 |
| | Isotactic pentad content | wt. % | 97.9 | 97.8 | 97.9 | 97.8 | 97.7 | 97.2 | 97.6 | 97.0 |
| Gas phase reactor | Temperature | ° C. | 70 | 70 | 70 | 70 | 70 | 70 | 70 | 70 |
| | Pressure | MPa | 1.1 | 1.1 | 1.1 | 1.1 | 1.1 | 1.1 | 1.1 | 1.1 |
| | Hydrogen/ethylene ratio | mol/mol | 0.13 | 0.1 | 0.14 | 0.02 | 0.35 | 0.04 | 0.01 | 0.02 |
| | Ethylene/(ethylene + propylene) ratio | mol/mol | 0.21 | 0.21 | 0.25 | 0.21 | 0.19 | 0.21 | 0.45 | 0.45 |
| | Component B | wt. % | 7.66 | 7.65 | 7.68 | 12.90 | 10.56 | 15.54 | 7.72 | 15.04 |
| | Ethylene content in component B | wt. % | 31.0 | 31.1 | 34.89 | 31.2 | 30.96 | 31.67 | 48.61 | 48.58 |
| Com-position | MFR (composition) | g/10 min | 9.32 | 11.7 | 10.7 | 8.89 | 19.31 | 26.0 | 10.1 | 26.5 |
| | Ethylene content (composition) | wt. % | 2.37 | 2.38 | 2.68 | 4.02 | 3.27 | 4.92 | 3.75 | 7.31 |
| | Intrinsic viscosity (composition) | dL/g | 1.96 | 1.88 | 1.86 | 2.08 | 1.61 | 1.52 | 1.95 | 1.52 |
| | Intrinsic viscosity of xylene solubles | dL/g | 1.94 | 2.57 | 1.7 | 3.65 | 1.57 | 3.26 | 3.95 | 3.50 |
| | Average size of rubber phase particles (injection molded specimen) | μm | 0.62 | 0.42 | 0.43 | 1.21 | 0.61 | 1.03 | 1.95 | 1.82 |
| | Average size of rubber phase particles (pellets) | μm | 0.25 | — | — | — | 0.11 | 0.37 | — | — |

—: not determined

TABLE 2

| | | Examples and Comparative examples | | | | | | | |
|---|---|---|---|---|---|---|---|---|---|
| | | Example A1 | Example A2 | Example A3 | Example A4 | Example A5 | Example A6 | Comparative Example A1 | Comparative Example A2 |
| Tensile strength | MPa | 34.8 | 34.7 | 34.9 | 28.6 | 33.7 | 29.6 | 34.1 | 31.5 |
| Flexural modulus | MPa | 1750 | 1760 | 1750 | 1350 | 1580 | 1320 | 1700 | 1360 |
| Charpy notched impact, 23° C. | $kJ/m^2$ | 7.11 | 7.07 | 7.12 | 10.80 | 6.59 | 9.31 | 7.23 | 8.89 |
| Heat deformation temperature | ° C. | 98.1 | 98.2 | 98.7 | 93.0 | 99.8 | 92.0 | 98.0 | 93.0 |
| Rockwell hardness | | 102 | 102 | 103 | 100 | 101 | 99 | 101 | 100 |
| Parallel shrinkage ratio | % | 1.13 | 1.13 | 1.13 | 1.05 | 1.10 | 1.08 | 1.19 | 1.17 |
| Vertical shrinkage ratio | % | 1.12 | 1.14 | 1.14 | 1.10 | 1.13 | 1.12 | 1.22 | 1.20 |
| 60° angle gloss | % | 91 | 86 | 86 | 85 | 90 | 86 | 69 | 70 |

It could be seen from the data in Tables 1 and 2 that compared with the cases of adjusting the polymerization process conditions so that the ethylene content in the ethylene-propylene elastic copolymer and/or the ratio of the melt mass flow rate of the homopolypropylene to that of the polypropylene composition are not within the ranges according to the present invention, the polypropylene composition of the present invention has a higher gloss and comparable or better mechanical properties.

Thus, the polypropylene composition of the present invention could be used in particular for the preparation of articles combining good mechanical properties (high rigidity, high toughness and low shrinkage properties) and aesthetic characteristics (high gloss).

Example B1

Preparation of main catalyst Cat-1: In a 300 mL glass reaction bottle, 90 mL (820 mmol) of titanium tetrachloride was added and cooled to −20° C., 37 mmol of magnesium halide carrier calculated as magnesium element (prepared according to the method disclosed in Example 1 of CN1330086A) was added thereto; then the temperature was increased to 110° C., and 0.3 mmol of tributyl phosphate and 7.3 mmol of 2-isopropyl-2-isopentyl-1,3-dimethoxypropane were added during increasing the temperature; after maintaining at 110° C. for 30 minutes, the liquid was filtered off and the resulting product was washed with titanium tetrachloride twice and with hexane five times, and vacuum-dried to obtain catalyst component Cat-1.

As determined by X-ray fluorescence spectroscopic analysis (X-ray fluorescence spectrometer: Model Zetium, from PANalytical B.V, Netherlands), the phosphorus content calculated as phosphorus element in the catalyst component Cat-1 was 0.011% by weight.

Polymerization reaction was carried out on a set of polypropylene pilot plant. The polymerization method and steps were as follows:

Pre-polymerization: After pre-contacting and reacting at 10° C. for 20 minutes, the main catalyst Cat-1, co-catalyst (triethylaluminum), and external electron donor methylcyclohexyldimethoxysilane (CHMMS) were continuously added to a pre-polymerization reactor for pre-polymerization reaction, wherein the flow rate of triethylaluminum (TEAL) was 6 g/hr, the flow rate of methylcyclohexyldimethoxysilane was 1.2 g/hr, and the flow rate of the main catalyst was 0.36 g/hr. The pre-polymerization was carried out in a propylene liquid phase bulk environment, wherein the temperature was 15° C., and the residence time was about 4 minutes.

After the pre-polymerization, the catalyst was fed to a loop reactor continuously, where propylene homopolymerization reaction was completed. The temperature of the loop polymerization reaction was 70° C., the reaction pressure was 4.0 MPa, hydrogen was led to the feed of the loop reactor, and the hydrogen concentration detected by online chromatograph was 0.10 mol %.

After the reaction in the loop reactor, the obtained material was fed to a fluidized bed gas phase reactor for the copolymerization reaction of ethylene and propylene. The temperature of the gas phase reaction was 70° C. and the reaction pressure was 1.1 MPa, wherein ethylene/(propylene+ethylene) was equal to 0.21 (volume ratio), a specific amount of hydrogen was added to the feed of the gas phase reactor, and the hydrogen/ethylene in the recycled gas of the gas phase reactor as detected by online chromatograph was equal to 0.11. The specific process is shown in Table 3.

The obtained polypropylene composition had an ethylene content in component B of 28.04% by weight and a ratio of the MFR of component A to the MFR of the composition of 0.87.

The polymer obtained by the reaction was subjected to degassing and deactivation treatment with wet nitrogen to obtain a polymer powder.

0.1% by weight of IRGAFOS 168, 0.1% by weight of IRGANOX 1010, 0.05% by weight of calcium stearate, 0.05% by weight of Millad HPN-715 and 0.05% by weight of Millad 600EI nucleating agent were added to the powder obtained by polymerization, followed by pelletization with a twin-screw extruder to obtain pellets of polypropylene composition. Then injection molded specimens that met GB standards were prepared using an injection molding machine, and determined for their physical properties. The determination results are shown in Table 4.

Figure 4:
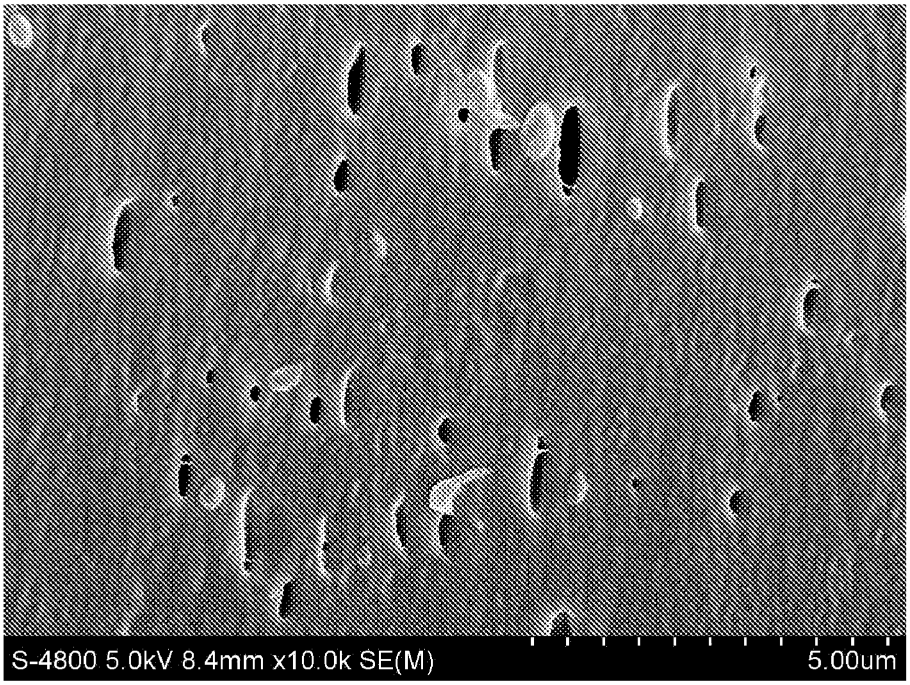
FIG. 4 shows the SEM photograph of the injection molded specimen of Example B1 at a position of the core part beyond 10% of the thickness from the article surface.
Figure 5:
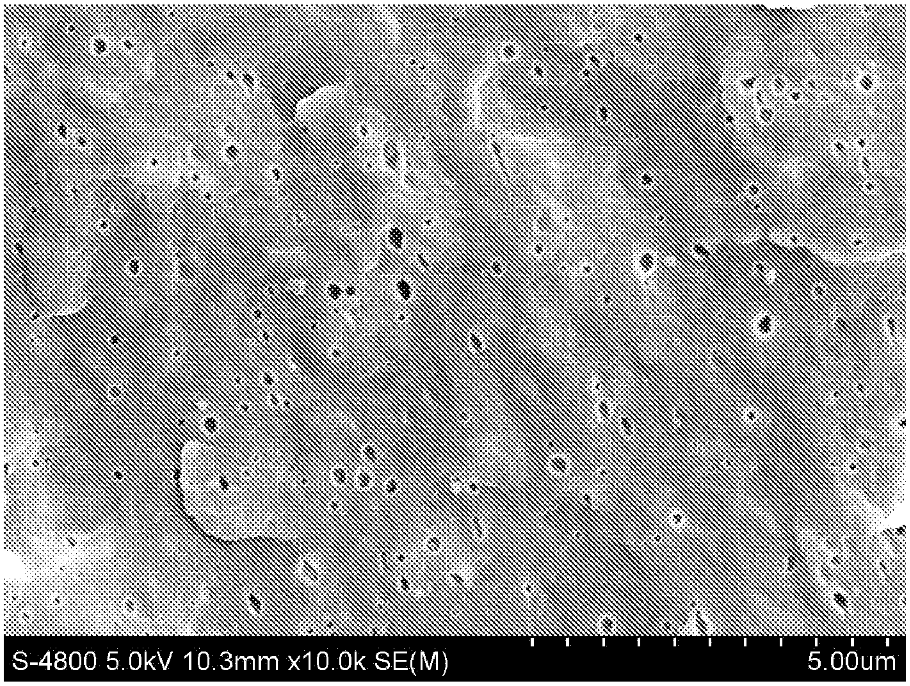
FIG. 5 shows the SEM photograph of the pellets of Example B1.

FIG. 4 showed the SEM photograph of the injection molded specimen of Example B1 at a position of the core part beyond 10% of the thickness from the article surface. FIG. 5 showed the SEM photograph of the pellets of Example B1. It could be seen from these SEM photographs that after injection molding, the rubber phase in the injection molded specimen prepared by Example B1 presented an obvious orientated structure, and at a position of the core part beyond 10% of the thickness from the article surface, the rubber phase was also deformed and oriented (at a position of the core part beyond 10% of the thickness from the article surface: more than 70% of the rubber phase particles had an aspect ratio of greater than 2, and some rubber phase particles even had an aspect ratio of greater than 4), while the rubber phase in the pellets before injection molding was substantially spherical.

Example B2

Example B2 used the same catalyst system, nucleating agent and polymerization process conditions as those in Example B1, except that the hydrogen concentration in the loop reactor was 0.13 mol %, and in the gas phase reactor, the hydrogen/ethylene=0.08 (mol/mol). The specific process conditions are shown in Table 3.

The resulting polypropylene composition had an ethylene content in component B of 28.05% by weight and a ratio of the MFR of component A to the MFR of the composition of 1.27.

The determination results of the properties of the obtained injection molded specimen are shown in Table 4.

SEM analysis showed that after injection molding, the rubber phase in the injection molded specimen of Example B2 presented an obvious orientated structure.

Example B3

Example B3 used the same catalyst system, nucleating agent and polymerization process conditions as those in Example B1, except that in the gas phase reactor, the ethylene/(propylene+ethylene)=0.25 (mol/mol), and the hydrogen/ethylene=0.12 (mol/mol). The specific process conditions are shown in Table 3.

The resulting polypropylene composition had an ethylene content in component B of 33.67% by weight and a ratio of the MFR of component A to the MFR of the composition of 0.93.

The determination results of the properties of the obtained injection molded specimen are shown in Table 4.

SEM analysis showed that after injection molding, the rubber phase in the injection molded specimen of Example B3 presented an obvious orientated structure.

Example B4

Example B4 used the same catalyst system, nucleating agent and polymerization process conditions as those in Example B1, except that the hydrogen concentration in the loop reactor was 0.13 mol %, and in the gas phase reactor, the ethylene/(propylene+ethylene)=0.15 (mol/mol), and the hydrogen/ethylene=0.18 (mol/mol). The specific process conditions are shown in Table 3.

The resulting polypropylene composition had an ethylene content in component B of 26.72% by weight and a ratio of the MFR of component A to the MFR of the composition of 1.04.

The determination results of the properties of the obtained injection molded specimen are shown in Table 4.

SEM analysis showed that after injection molding, the rubber phase in the injection molded specimen of Example B4 presented an obvious orientated structure.

Example B5

Example B5 used the same catalyst system, nucleating agent and polymerization process conditions as those in Example B1, except that the hydrogen concentration in the loop reactor was 0.18 mol %, and in the gas phase reactor, the ethylene/(propylene+ethylene)=0.19 (mol/mol), and the hydrogen/ethylene=0.22 (mol/mol). The specific process conditions are shown in Table 3.

The resulting polypropylene composition had an ethylene content in component B of 27.89% by weight and a ratio of the MFR of component A to the MFR of the composition of 1.09.

The determination results of the properties of the obtained injection molded specimen are shown in Table 4.

SEM analysis showed that after injection molding, the rubber phase in the injection molded specimen of Example B5 presented an obvious orientated structure.

Example B6

Example B6 used the same catalyst system, nucleating agent and polymerization process conditions as those in Example B1, except that the hydrogen concentration in the loop reactor was 0.24 mol %, and in the gas phase reactor, the ethylene/(propylene+ethylene)=0.13 (mol/mol), and the hydrogen/ethylene=0.54 (mol/mol). The specific process conditions are shown in Table 3.

The resulting polypropylene composition had an ethylene content in component B of 25.05% by weight and a ratio of the MFR of component A to the MFR of the composition of 1.04.

The determination results of the properties of the obtained injection molded specimen are shown in Table 4.

SEM analysis showed that after injection molding, the rubber phase in the injection molded specimen of Example B6 presented an obvious orientated structure.

Example B7

Example B7 used the same catalyst system, nucleating agent and polymerization process conditions as those in Example B1, except that the hydrogen concentration in the loop reactor was 0.35 mol %, and in the gas phase reactor, the ethylene/(propylene+ethylene)=0.21 (mol/mol), and the hydrogen/ethylene=0.10 (mol/mol). The specific process conditions are shown in Table 3.

The resulting polypropylene composition had an ethylene content in component B of 28.05% by weight and a ratio of the MFR of component A to the MFR of the composition of 1.53.

The determination results of the properties of the obtained injection molded specimen are shown in Table 4.

SEM analysis showed that after injection molding, the rubber phase in the injection molded specimen of Example B7 presented an obvious orientated structure.

Example C1

Example C1 used diisobutyl phthalate as the internal electron donor of the main catalyst, and used the same external electron donor, co-catalyst, nucleating agent and polymerization process conditions as those in Example B5, except that the hydrogen concentration in the loop reactor was 0.24 mol %, and in the gas phase reactor, the hydrogen/ethylene=0.35 (mol/mol). The specific process conditions are shown in Table 3.

The resulting polypropylene composition had an ethylene content in component B of 30.98% by weight and a ratio of the MFR of component A to the MFR of the composition of 1.08.

The determination results of the properties of the obtained injection molded specimen are shown in Table 4.

Example C2

Example C2 used diisobutyl phthalate and diethyl phthalate as the internal electron donor of the main catalyst, and used the same external electron donor, co-catalyst, and polymerization process conditions as those in Example B1, except that no nucleating agent was added. The specific process conditions are shown in Table 3.

The resulting polypropylene composition had an ethylene content in component B of 28.04% by weight and a ratio of the MFR of component A to the MFR of the composition of 0.87.

The determination results of the properties of the obtained injection molded specimen are shown in Table 4.

Comparative Example C1

Comparative Example C1 used diisobutyl phthalate as the internal electron donor of the main catalyst, and diisopropyldimethoxysilane (DIPMS) as the external electron donor, and used the same co-catalyst, nucleating agent and polymerization process conditions as those in Example B1, except that, in terms of process conditions, the hydrogen concentration in the loop reactor was 0.25 mol %, and in the gas phase reactor, the ethylene/(propylene+ethylene)=0.45 (mol/mol), and the hydrogen/ethylene=0.02 (mol/mol). The specific process conditions are shown in Table 3.

The resulting polypropylene composition had an ethylene content in component B of 48.61% by weight and a ratio of the MFR of component A to the MFR of the composition of 2.03.

The determination results of the properties of the obtained injection molded specimen are shown in Table 4.

Comparative Example C2

Comparative Example C2 used diisobutyl phthalate as the internal electron donor of the main catalyst, and diisopropyldimethoxysilane (DIPMS) as the external electron donor, and used the same co-catalyst, nucleating agent and polymerization process conditions as those in Example B1, except that, in terms of process conditions, the hydrogen concentration in the loop reactor was 0.65 mol %, and in the gas phase reactor, the ethylene/(propylene+ethylene)=0.45 (mol/mol), and the hydrogen/ethylene=0.02 (mol/mol). The specific process conditions are shown in Table 3.

The resulting polypropylene composition had an ethylene content in component B of 48.58% by weight and a ratio of the MFR of component A to the MFR of the composition of 1.95.

The determination results of the properties of the obtained injection molded specimen are shown in Table 4.

Comparative Example C3

Comparative Example C3 used diisobutyl phthalate as the internal electron donor of the main catalyst, and used the same external electron donor, co-catalyst, nucleating agent and polymerization process conditions as those in Example B5, except that the hydrogen concentration in the loop reactor was 0.18 mol %, and in the gas phase reactor, the hydrogen/ethylene=0.35 (mol/mol). The specific process conditions are shown in Table 3.

The resulting polypropylene composition had an ethylene content in component B of 31.05% by weight and a ratio of the MFR of component A to the MFR of the composition of 1.05.

The determination results of the properties of the obtained injection molded specimen are shown in Table 4.

TABLE 3

| | | | Examples and comparative examples | | | | | |
|---|---|---|---|---|---|---|---|---|
| | | | Ex. B1 | Ex. B2 | Ex. B3 | Ex. B4 | Ex. B5 | Ex. B6 |
| Liquid phase reactor | Temperature | ° C. | 70 | 70 | 70 | 70 | 70 | 70 |
| | Pressure | MPa | 4.0 | 4.0 | 4.0 | 4.0 | 4.0 | 4.0 |
| | Hydrogen/ propylene ratio | mol/mol | 0.0010 | 0.0013 | 0.001 | 0.0013 | 0.0018 | 0.0024 |
| | MFR (component A) | g/10 min | 10.0 | 15 | 10 | 15.0 | 22.0 | 27.0 |
| | Component A | wt. % | 92.55 | 92.58 | 92.53 | 92.32 | 88.53 | 88.32 |
| | Intrinsic viscosity | dL/g | 1.96 | 1.72 | 1.96 | 1.72 | 1.54 | 1.50 |
| | Isotactic pentad content | wt. % | 97.9 | 97.7 | 97.9 | 97.8 | 97.7 | 97.2 |
| Gas phase reactor | Temperature | ° C. | 70 | 70 | 70 | 70 | 70 | 70 |
| | Pressure | MPa | 1.1 | 1.1 | 1.1 | 1.1 | 1.1 | 1.1 |
| | Hydrogen/ ethylene ratio | mol/mol | 0.11 | 0.08 | 0.12 | 0.18 | 0.22 | 0.54 |
| | Ethylene/ (ethylene + propylene) ratio | mol/mol | 0.21 | 0.21 | 0.25 | 0.15 | 0.19 | 0.13 |
| | Component B | wt. % | 7.45 | 7.42 | 7.47 | 7.68 | 11.47 | 11.68 |
| | Ethylene content of component B | wt. % | 28.04 | 28.05 | 33.67 | 26.72 | 27.89 | 25.05 |
| Com-position | MFR (composition) | g/10 min | 11.5 | 11.8 | 10.8 | 14.4 | 20.2 | 25.9 |
| | Ethylene content (composition) | wt. % | 2.09 | 2.08 | 2.52 | 2.05 | 3.20 | 2.92 |
| | Intrinsic viscosity (composition) | dL/g | 1.89 | 1.88 | 1.8 | 1.76 | 1.57 | 1.52 |
| | Intrinsic viscosity of xylene solubles | dL/g | 1.72 | 2.57 | 1.7 | 1.73 | 1.65 | 1.11 |
| | Mw/Mn | | 3.90 | 4.45 | 3.89 | 3.78 | 4.15 | 3.77 |
| | Average size of rubber phase particles (injection molded specimen) | µm | 0.30 | 0.42 | 0.43 | 0.10 | 0.12 | 0.05 |
| | Average size of rubber phase particles (pellets) | µm | 0.17 | — | — | — | 0.07 | — |

| | | | Examples and comparative examples | | | | | |
|---|---|---|---|---|---|---|---|---|
| | | | Ex. B7 | Ex. C1 | Ex. C2 | Comp. Ex. C1 | Comp. Ex. C2 | Comp. Ex. C3 |
| Liquid phase reactor | Temperature | ° C. | 70 | 70 | 70 | 70 | 70 | 70 |
| | Pressure | MPa | 4.0 | 4.0 | 4.0 | 4.0 | 4.0 | 4.0 |
| | Hydrogen/ propylene ratio | mol/mol | 0.0035 | 0.0024 | 0.0010 | 0.0025 | 0.0065 | 0.001 8 |
| | MFR (component A) | g/10 min | 40.0 | 22 | 10 | 20.5 | 50.0 | 20 |
| | Component A | wt. % | 86.99 | 89.67 | 92.55 | 92.56 | 86.83 | 89.69 |
| | Intrinsic viscosity | dL/g | 1.30 | 1.54 | 1.96 | 1.58 | 1.27 | 1.57 |
| | Isotactic pentad content | wt. % | 97.1 | 97.5 | 97.9 | 97.8 | 97.0 | 95.05 |

TABLE 3-continued

| | | | | | | | | |
|---|---|---|---|---|---|---|---|---|
| Gas phase reactor | Temperature | ° C. | 70 | 70 | 70 | 70 | 70 | 70 |
| | Pressure | MPa | 1.1 | 1.1 | 1.1 | 1.1 | 1.1 | 1.1 |
| | Hydrogen/ ethylene ratio | mol/mol | 0.10 | 0.35 | 0.11 | 0.02 | 0.02 | 0.35 |
| | Ethylene/ (ethylene + propylene) ratio | mol/mol | 0.21 | 0.19 | 0.21 | 0.45 | 0.45 | 0.19 |
| | Component B | wt. % | 13.0 | 10.33 | 7.45 | 7.44 | 13.17 | 10.31 |
| | Ethylene content of component B | wt. % | 28.05 | 30.98 | 28.04 | 48.61 | 48.58 | 31.05 |
| Com- position | MFR (composition) | g/10 min | 26.1 | 20.4 | 11.5 | 10.1 | 25.7 | 19.1 |
| | Ethylene content (composition) | wt. % | 3.65 | 3.2 | 2.09 | 3.62 | 6.40 | 3.2 |
| | Intrinsic viscosity (composition) | dL/g | 1.52 | 1.56 | 1.89 | 1.98 | 1.52 | 1.58 |
| | Intrinsic viscosity of xylene solubles | dL/g | 1.74 | 1.66 | 1.72 | 3.30 | 3.30 | 1.6 |
| | Mw/Mn | | 4.55 | 5.66 | 3.9 | 8.02 | 8.65 | 5.56 |
| | Average size of rubber phase particles (injection molded specimen) | μm | 0.58 | 0.61 | 0.3 | 1.82 | 1.82 | 0.6 |
| | Average size of rubber phase particles (pellets) | μm | — | — | — | — | — | — |

—: not determined

TABLE 4

| | | Examples and comparative examples | | | | | | | | | | | |
|---|---|---|---|---|---|---|---|---|---|---|---|---|---|
| | | Ex. B1 | Ex. B2 | Ex. B3 | Ex. B4 | Ex. B5 | Ex. B6 | Ex. B7 | Ex. C1 | Ex. C2 | Comp. Ex. C1 | Comp. Ex. C2 | Comp. Ex. C3 |
| Tensile strength | MPa | 34.6 | 34.6 | 34.7 | 33.1 | 32.7 | 32.2 | 31.8 | 33.1 | 25.4 | 34.8 | 31.5 | 28.5 |
| Flexural modulus | MPa | 1620 | 1630 | 1650 | 1590 | 1520 | 1500 | 1400 | 1530 | 1180 | 1650 | 1390 | 1400 |
| Charpy notched impact, 23° C. | $kJ/m^2$ | 7.26 | 7.3 | 7.2 | 7.45 | 6.27 | 6.50 | 8.02 | 6.1 | 7.4 | 7.23 | 8.21 | 6 |
| Heat deformation temperature | ° C. | 110 | 110 | 111 | 109 | 103 | 100 | 98 | 100 | 80 | 111 | 96 | 97 |
| Rockwell hardness | | 106 | 107 | 108 | 106 | 99.6 | 98.7 | 96.0 | 99 | 82 | 108 | 94 | 96 |
| Parallel shrinkage ratio | % | 1.03 | 1.05 | 1.05 | 1.02 | 1.04 | 1.01 | 1.07 | 1.03 | 1.07 | 1.19 | 1.17 | 1.03 |
| Vertical shrinkage ratio | % | 1.35 | 1.36 | 1.36 | 1.33 | 1.29 | 1.27 | 1.35 | 1.3 | 1.12 | 1.37 | 1.35 | 1.32 |
| 60° angle gloss | % | 91 | 86 | 86 | 92 | 95 | 105 | 89 | 89 | 89 | 69 | 70 | 88 |
| Haze | % | 37 | 45 | 47 | 28 | 34 | 12 | 48 | 60 | 51 | 90 | 89 | 55 |

It could be seen from the data in Tables 3 and 4 that compared with the cases of adjusting the polymerization process conditions so that the stereoregularity of the homopolypropylene, the ethylene content in the ethylene-propylene elastic copolymer and/or the ratio of the melt mass flow rate of the homopolypropylene to that of the polypropylene composition were not within the ranges according to the present invention, the polypropylene composition of the present invention had a lower haze and a higher gloss, and thus a better transparency and aesthetic characteristics, and at the same time had comparable or better mechanical properties.

Compared with the catalytic system using a carboxylic acid ester as the internal electron donor, the polypropylene composition prepared by the catalyst system using the internal electron donor compounded by a phosphoric acid ester compound and a diether compound had a higher gloss and a lower haze as well as comparable mechanical properties, and it could combine the properties of good transparency, high gloss, high rigidity, high toughness and low shrinkage, thereby having both good mechanical properties and aesthetic characteristics.

In addition, it could be seen from a comparison between Example C2 and Example B1 that nucleating agent was added in Example B1, and the resulting product had a higher modulus and a lower haze.

The present invention has been illustrated above with reference to examples, but the illustration is not exhaustive and is not intended to limit the scope of the present invention. Without departing from the scope and spirit of the present invention, many modifications and alterations will be apparent to those skilled in the art.

The endpoints and any values of the ranges disclosed herein are not limited to such precise ranges or values, and these ranges or values shall be understood to include the values close to these ranges or values. For numerical ranges, combination can be made with each other between the endpoints of the various ranges, between the endpoints and individual point values of the various ranges, as well as between the individual point values to obtain one or more new numerical ranges, which should be considered as being specifically disclosed herein.

The invention claimed is:

1. A polypropylene composition comprising:

(a) 70-95% by weight of a crystalline homopolypropylene as component A, with an isotactic pentad fraction of 96% or more; wherein the crystalline homopolypropylene forms a continuous matrix phase in the polypropylene composition; and (b) 5-30% by weight of an ethylene-propylene elastic copolymer as component B, wherein based on the total weight of the ethylene-propylene elastic copolymer, the ethylene-propylene elastic copolymer contains 20-35% by weight of ethylene structural units of ethylene structural units, and 65-80% by weight of propylene structural units, of propylene structural units; the ethylene-propylene elastic copolymer forms a dispersed rubber phase in the continuous matrix phase, the rubber phase is capable of being deformed at least partially under the action of orientation force and forming an oriented structure;

wherein the ratio of the melt mass flow rate of the crystalline homopolypropylene to that of the polypropylene composition measured at 230° C. under a load of 2.16 kg according to GB/T 3682.1-2018 ranges from 0.5 to 2.0.

2. The polypropylene composition according to claim 1, wherein when no orientation force acts, the rubber phase is spherical or nearly spherical particles, and the rubber phase particles have an average size ranging from 0.03 μm to 3.0 μm, as determined by SEM method.

3. The polypropylene composition according to claim 1, wherein after the orientation force acts, at least 50% of the rubber phase particles have an aspect ratio greater than 2, based on the total number of rubber phase particles in the SEM photograph.

4. The polypropylene composition according to claim 1, wherein the orientation force refers to an external field force that is capable of causing an object to be oriented, the orientation refers to the parallel alignment of the object along the direction of the external field force; the oriented structure is a structure in which the longitudinal axes formed by deformation and elongation of the rubber phase particles under the action of the orientation force are aligned parallel to each other along a direction.

5. The polypropylene composition according to claim 1, wherein the crystalline homopolypropylene has a melt mass flow rate ranging from 5 g/10 min to 200 g/10 min at 230° C. under a load of 2.16 kg according to GB/T 3682.1-2018; and/or the polypropylene composition has a melt mass flow rate ranging from 5 g/10 min to 100 g/10 min at 230° C. under a load of 2.16 kg according to GB/T 3682.1-2018.

6. The polypropylene composition according to claim 1, wherein the intrinsic viscosity of the polypropylene composition ranges from 1.0 dL/g to 2.5 dL/g; and/or the intrinsic viscosity of xylene solubles in the polypropylene composition ranges from 1.0 dL/g to 4.0 dL/g; and/or the ratio of the intrinsic viscosity of xylene solubles to the intrinsic viscosity of the crystalline homopolypropylene in the polypropylene composition ranges from 0.7 to 2.6.

7. The polypropylene composition according to claim 1, wherein the molecular weight distribution Mw/Mn of the polypropylene composition is less than or equal to 5, as determined by gel permeation chromatography (GPC) analysis relative to polystyrene standards.

8. The polypropylene composition according to claim 1, wherein the polypropylene composition has a 60° angle gloss of greater than or equal to 80%.

9. The polypropylene composition according to claim 8, wherein the polypropylene composition further has one or more of the following properties:

1) Parallel shrinkage ratio of less than or equal to 1.15;
2) Vertical shrinkage ratio of less than or equal to 1.36;
3) Flexural modulus of greater than or equal to 1000 MPa;
4) Charpy notched impact strength at room temperature of greater than or equal to 5 $kJ/m^2$; and
5) Heat deformation temperature of greater than or equal to 90° C.

10. The polypropylene composition according to claim 1, wherein the polypropylene composition further comprises: (c) a nucleating agent as component C, which is at least one selected from the group consisting of carboxylic acids and their metal salts, sorbitol, aryl phosphates, dehydroabietic acid and its salts, aromatic amides, aromatic amines, rare earth compounds, condensed ring compounds having a quasi-planar structure, and polymeric nucleating agents.

11. The polypropylene composition according to claim 1, wherein the polypropylene composition further comprises other auxiliary, said other auxiliary is at least one selected from the group consisting of antioxidants, antistatic agents and colorants.

12. The polypropylene composition according to claim 1, wherein the polypropylene composition is in the form of powders or pellets.

13. A method for the preparation of the polypropylene composition according to claim 1, comprising:

(1) under first olefin polymerization conditions, contacting and reacting propylene monomers with a stereoselective Ziegler-Natta catalyst, and removing the unreacted monomers from the mixture obtained after the contacting and reacting to obtain a product "a", said product "a" comprising component A; and (2) under second olefin polymerization conditions, contacting and reacting ethylene monomers and propylene monomers with the product "a" obtained in step (1) under gas phase, and removing the unreacted monomers from the mixture obtained after the contacting and reacting to obtain product "b" comprising component A and component B, wherein the product "b" is the polypropylene composition.

14. The method according to claim 13, wherein the stereoselective Ziegler-Natta catalyst comprises:

(i) a solid catalyst component, containing a product obtainable from a reaction of a magnesium source, a titanium source and an internal electron donor; wherein the internal electron donor is selected from the group consisting of monocarboxylic acid esters, dicarboxylic acid esters, phosphoric acid ester compounds, diether compounds and combinations thereof; the magnesium source is one or more selected from magnesium halide, magnesium alcoholate, magnesium halogenated alcoholate and magnesium halide adduct carrier; the titanium source is one or more selected from the titanium compounds represented by the general formula $Ti(OR)_{4-m}X_m$, wherein m is an integer of 0-4, R is a $C_1$-$C_{20}$ alkyl, X is halogen;

(ii) an organoaluminum compound; and (iii) optionally an external electron donor, which is an organosilicon compound having the general formula $R_nSi(OR')_{4-n}$, where $0<n\leq 3$, R is selected from hydrogen atom, halogen, alkyl, cycloalkyl, aryl and haloalkyl, and R' is selected from alkyl, cycloalkyl, aryl and haloalkyl.

15. The method according to claim 14, wherein the internal electron donor is at least one selected from the group consisting of benzoate, malonate, phthalate and succinate.

16. The method according to claim 14, wherein the internal electron donor is an internal electron donor compounded by a phosphoric acid ester compound and a diether compound.

17. The method according to claim 14, wherein the molar ratio of the magnesium source in terms of magnesium element, the titanium source in terms of titanium element and the internal electron donor is 1:(20-150):(0.1-0.9); and/or the amount ratio of the solid catalyst component to the organoaluminum compound in terms of titanium/aluminum molar ratio is 1:(25-100); and/or the weight ratio of the organoaluminum compound to the external electron donor is (0-150):1.

18. The method according to claim 13, wherein in step (1), the first olefin polymerization conditions are liquid phase polymerization conditions or gas phase polymerization conditions; the liquid phase polymerization conditions comprise: using hydrogen as a molecular weight regulator, a polymerization temperature ranging from 0° C. to 150° C.; and a polymerization pressure higher than the saturated vapor pressure of propylene at the corresponding polymerization temperature; the gas phase polymerization conditions comprise: using hydrogen as a molecular weight regulator, a polymerization temperature of ranging from 0° C. to 150° C.; and a polymerization pressure greater than or equal to normal pressure; the hydrogen/propylene molar ratio used in step (1) ranges from 0.0010 to 0.0060.

19. The method according to claim 13, wherein in the reaction system of step (2), the molar ratio of ethylene/(ethylene+propylene) ranges from 0.1 to 0.4; and/or the temperature of olefin gas phase polymerization ranges from 40° C. to 100° C.; and the pressure ranging from 0.6 MPa to 1.4 MPa; and/or the hydrogen/ethylene molar ratio ranges from 0.02 to 0.70.

20. The method according to claim 13, wherein the method further comprises step (3): subjecting the product "b" obtained in step (2) and a nucleating agent and optionally other auxiliaries to mixing.

21. An article prepared from the polypropylene composition according to claim 1, wherein at least a part of the rubber phase of the rubber phase particles is deformed and forms an oriented structure.

22. The article according to claim 21, wherein the article is a product or a part of the product, wherein the product is selected from housings for home appliances, automotive interior parts, children's toys, home storage products and medical disposable syringes.

23. The polypropylene composition according to claim 1, wherein the crystalline homopolypropylene has an isotactic pentad fraction of 97% or more.

24. The polypropylene composition according to claim 1, wherein the ethylene-propylene elastic copolymer contains 25-35% by weight of ethylene structural units, and 65-75% by weight of propylene structural units.

25. The polypropylene composition according to claim 1, wherein the ratio of the melt mass flow rate of the crystalline homopolypropylene to that of the polypropylene composition measured at 230° C. under a load of 2.16 kg according to GB/T 3682.1-2018 ranges from 0.9 to 1.5.

26. The polypropylene composition according to claim 4, wherein the orientation force is tensile stress and/or shear stress which is applied to the polypropylene composition during the process of preparing an article using said composition.

27. The polypropylene composition according to claim 4, wherein at least 80% of the rubber phase particles form an oriented structure, based on the total number of rubber phase particles in the SEM photograph.

28. The polypropylene composition according to claim 5, wherein the crystalline homopolypropylene has a melt mass flow rate ranging from 10 g/10 min to 100 g/10 min at 230° C. under a load of 2.16 kg according to GB/T 3682.1-2018; and/or the polypropylene composition has a melt mass flow rate ranging from 6 g/10 min to 30 g/10 min at 230° C. under a load of 2.16 kg according to GB/T 3682.1-2018.

29. The polypropylene composition according to claim 7, wherein the molecular weight distribution Mw/Mn of the polypropylene composition is less than or equal to 4.5, as determined by gel permeation chromatography (GPC) analysis relative to polystyrene standards.

30. The polypropylene composition according to claim 8, wherein the polypropylene composition has a 60° angle gloss of greater than or equal to 90%.

31. The polypropylene composition according to claim 8, wherein the polypropylene composition further has a haze of less than or equal to 50%.

32. The polypropylene composition according to claim 9, wherein the polypropylene composition further has all of said properties.

33. The method according to claim 14, wherein the magnesium source is spherical magnesium halide adduct.

34. The method according to claim 14, wherein the organoaluminum compound is at least one selected from the group consisting of triethylaluminum, tri-n-butylaluminum, triisobutylaluminum, tri-n-hexylaluminum, diethylaluminum monochloride, di-n-butylaluminum monochloride, diisobutylaluminum monochloride, di-n-hexylaluminum monochloride, ethylaluminum dichloride, n-butylaluminum dichloride, isobutylaluminum dichloride and n-hexylaluminum dichloride.

35. The method according to claim 14, wherein the external electron donor is at least one selected from the group consisting of tetramethoxysilane, tetraethoxysilane, trimethylmethoxysilane, trimethylethoxysilane, trimethylphenoxysilane, dimethyldimethoxysilane, dimethyldiethoxysilane, methyl tert-butyldimethoxysilane, methylisopropyldimethoxysilane, diphenoxydimethoxysilane, diphenyldiethoxysilane, phenyltrimethoxysilane, phenyltriethoxysilane, vinyltrimethoxysilane, cyclohexylmethyldimethoxysilane, dicyclopentyldimethoxysilane, diisopropyldimethoxysilane, diisobutyldimethoxysilane, 2-ethylpiperidinyl-2-tert-butyldimethoxysilane, (1,1,1-trifluoro-2-propyl)-2-ethylpiperidinyldimethoxysilane, and (1,1,1-trifluoro-2-propyl)-methyldimethoxysilane.

36. The method according to claim 14, wherein the catalyst has been subjected to pre-complexation and/or pre-polymerization treatments.

37. The method according to claim 16, wherein the molar ratio of the amount of the diether compound to that of the phosphoric acid ester compound is 1: (0.02-0.25).

38. The method according to claim 16, wherein the phosphoric acid ester compound is at least one selected from the phosphoric acid ester compounds represented by formula (1), formula (1)

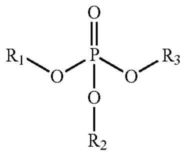

wherein $R_1$, $R_2$ and $R_3$ are each independently selected from $C_1$-$C_4$ linear or branched alkyl, $C_3$-$C_{20}$ cycloalkyl, $C_6$-$C_{20}$ aryl, $C_7$-$C_{20}$ alkaryl or $C_7$-$C_{20}$ aralkyl; and wherein the diether compound is at least one selected from the diether compounds represented by formula (2), $$R^1R^2C(CH_2OR^3)(CH_2OR^4) \quad \text{formula (2)}$$

wherein $R^1$ and $R^2$ are each independently selected from hydrogen, $C_1$-$C_{20}$ linear or branched alkyl, $C_3$-$C_{20}$ cycloalkyl, $C_6$-$C_{20}$ aryl, $C_7$-$C_{20}$ aralkyl or $C_7$-$C_{20}$ alkaryl, $R^3$ and $R^4$ are each independently selected from $C_1$-$C_{10}$ alkyl.

39. The method according to claim 38, wherein the phosphoric acid ester compound is at least one selected from trimethyl phosphate, triethyl phosphate, tributyl phosphate, triphenyl phosphate, tricresyl phosphate, triisopropylphenyl phosphate, trimethoxy phenyl phosphate, phenyl dimethyl phosphate, cresyl dibutyl phosphate, cumyl dimethyl phosphate, cumyl diethyl phosphate, cumyl dibutyl phosphate, phenyl xylyl phosphate, phenyl diisopropylphenyl phosphate, p-cresyl dibutyl phosphate, m-cresyl dibutyl phosphate, p-cumyl dimethyl phosphate, p-cumyl diethyl phosphate, p-tert-butylphenyl dimethyl phosphate and o-cresyl p-di-tert-butylphenyl phosphate; and the diether compound is at least one selected from 2-(2-ethylhexyl)-1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2,2-dicyclohexyl-1,3-dimethoxypropane, 2,2-dicyclopentyl-1,3-dimethoxypropane, 2,2-diethyl-1,3-dimethoxypropane, 2,2-dipropyl-1,3-dimethoxypropane, 2,2-diisopropyl-1,3-dimethoxypropane, 2,2-dibutyl-1,3-dimethoxypropane, 2-methyl-2-propyl-1,3-dimethoxypropane, 2-methyl-2-benzyl-1,3-dimethoxypropane, 2-methyl-2-ethyl-1,3-dimethoxypropane, 2-methyl-2-isopropyl-1,3-dimethoxypropane, 2-methyl-2-phenyl-1,3-dimethoxypropane, 2-methyl-2-cyclohexyl-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2-isobutyl-2-isopropyl-1,3-dimethoxypropane, 2-(1-methylbutyl)-2-isopropyl-1,3-dimethoxypropane, 2-isopropyl-2-isopentyl-1,3-dimethoxypropane, 2-phenyl-2-isopropyl-1,3-dimethoxypropane, 2-phenyl-2-sec-butyl-1,3-dimethoxypropane, 2-benzyl-2-isopropyl-1,3-dimethoxypropane, 2-cyclopentyl-2-isopropyl-1,3-dimethoxypropane, 2-cyclopentyl-2-sec-butyl-1,3-dimethoxypropane, 2-cyclohexyl-2-isopropyl-1,3-dimethoxypropane, 2-cyclohexyl-2-sec-butyl-1,3-dimethoxypropane, 2-isopropyl-2-sec-butyl-1,3-dimethoxypropane, 2-cyclohexyl-2-cyclohexylmethyl-1,3-dimethoxypropane and 9,9-dimethoxymethylfluorene.

40. The method according to claim 20, wherein in step (3) further pelletization is carried out.

41. The article according to claim 21, wherein the article is an injection molded article.

42. The article according to claim 21, wherein at least 80% of the rubber phase particles are deformed and form an oriented structure.

43. The article according to claim 21, wherein both at a position within 10% of the thickness from the article surface and at a position of the core part beyond 10% of the thickness from the article surface, the rubber phase is deformed, elongated and forms an oriented structure.

44. The article according to claim 21, wherein more than 50% of the rubber phase particles at a position within 10% of the thickness from the article surface have an aspect ratio greater than or equal to 4; and more than 50% of the rubber phase particles at a position of the core part beyond 10% of the thickness from the article surface have an aspect ratio greater than or equal to 2, based on the total number of the rubber phase particles at the corresponding position in the SEM photograph.

* * * * *